United States Patent [19]

Guttag et al.

[11] Patent Number: 5,056,041
[45] Date of Patent: Oct. 8, 1991

[54] DATA PROCESSING APPARATUS WITH IMPROVED BIT MASKING CAPABILITY

[75] Inventors: Karl M. Guttag, Missouri City; Michael Asal, Sugar Land, both of Tex.; Richard Simpson, Bedford, England; Thomas Preston, Middlebury, Conn.; John Sharkey, Glasgow, United Kingdom

[73] Assignee: Texas Instruments Incorporated, Dallas, Tex.

[21] Appl. No.: 387,404

[22] Filed: Jul. 31, 1989

Related U.S. Application Data

[63] Continuation of Ser. No. 947,944, Dec. 31, 1986, abandoned, which is a continuation-in-part of Ser. No. 790,299, Oct. 22, 1985, abandoned.

[51] Int. Cl.$^5$ .............................................. G06F 15/20
[52] U.S. Cl. ...................................... 364/518; 340/798
[58] Field of Search ........ 364/518, 521, 200 MS File; 340/798–800

[56] References Cited

U.S. PATENT DOCUMENTS

| 4,405,979 | 9/1983 | Holtey et al. | 364/200 |
|---|---|---|---|
| 4,460,957 | 7/1984 | Eggebrecht et al. | 364/200 |
| 4,562,537 | 12/1985 | Barnett et al. | 364/200 |
| 4,779,223 | 10/1988 | Asal et al. | 364/900 |

OTHER PUBLICATIONS

NEC Electronics U.S.A., Inc. 1982 Catalog, Microcomputer Division, pp. 515–536 μPD7220/GDC Graphics Display Controller.

*Primary Examiner*—Heather R. Herndon
*Attorney, Agent, or Firm*—Melvin Sharp; James T. Comfort; Lawrence J. Bassuk

[57] ABSTRACT

A graphics processor device is disclosed which performs bit-by-bit masking outside of the central processing unit, by way of a read-modify-write cycle to external or internal memory. A mask bus is incorporated into the device so that, for each bit of the external data word, a mask bit is present which indicates whether data from the central processing unit (CPU) is to be written to memory (unmasked) or if that bit of memory contents is to remain unaltered (masked). The CPU data is written into a latch at the memory interface during such time as the latch is isolated from the external memory bus and during the read portion of the read-modify-write cycle. For those bits which are to be masked, the latch is overwritten with the data read from memory, while for the unmasked bits the latch remains isolated from the external memory bus. During the write portion of the read-modify-write cycle, the contents of the latch are driven onto the external memory bus. The bit-by-bit masking may also be done for data in internal memory, by multiplexing the CPU data and the internal memory data onto the CPU data bus.

27 Claims, 18 Drawing Sheets

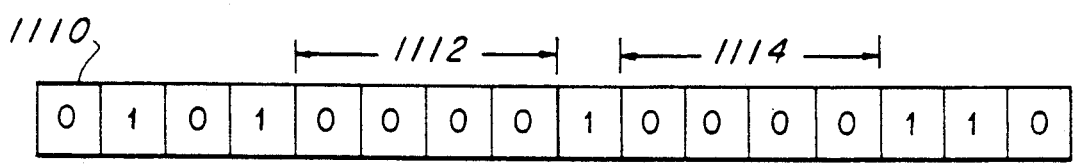
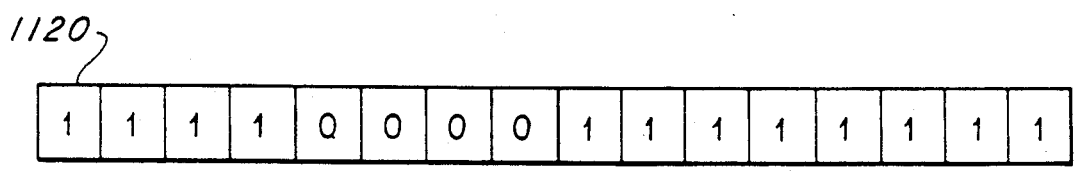
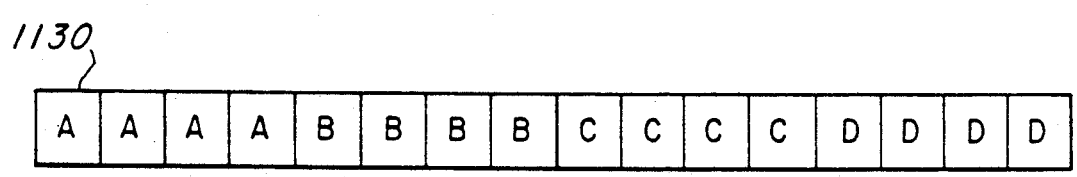
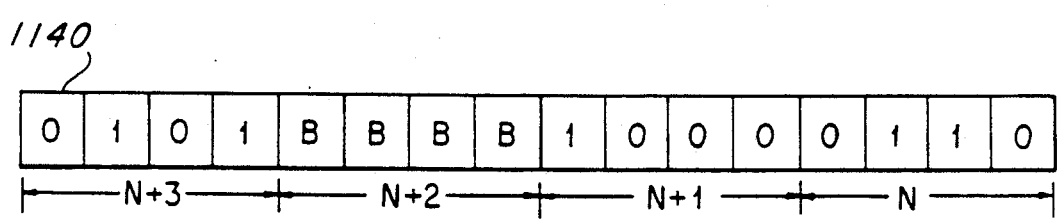
Fig. 11
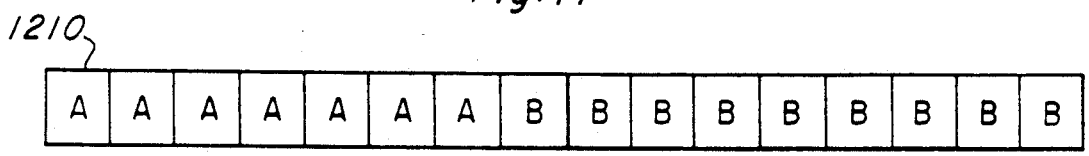
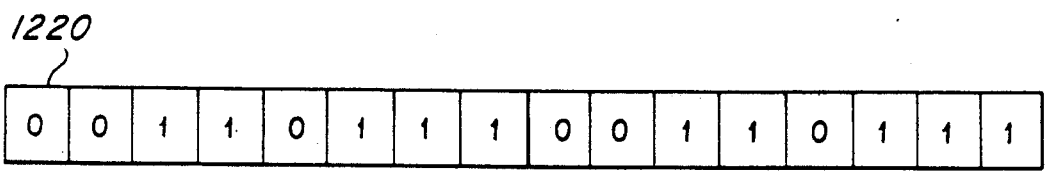
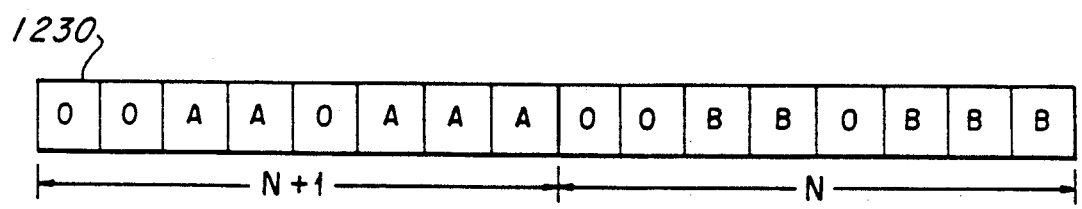
Fig. 12

Fig. 19

DATA PROCESSING APPARATUS WITH IMPROVED BIT MASKING CAPABILITY

This application is a continuation of application Ser. No. 06/947,944, filed 12/31/86, now abandoned, which is a continuation-in-part of application Ser. No. 790,299 filed Oct. 22, 1985, abandoned in favor of application Ser. No. 317,043 filed Feb. 24, 1989.

This application is related to applications Ser. No. 790,293 filed Oct. 22, 1985, abandoned in favor of application Ser. No. 342,586, filed Apr. 14, 1986; Ser. No. 795,158 filed Nov. 5, 1985, now U.S. Pat. No. 4,718,024; Ser. No. 795,380 filed Nov. 6, 1985, now U.S. Pat. No. 4,689,807; Ser. No. 795,383 filed Nov. 6, 1985, abandoned in favor of application Ser. No. 361,747, filed June 1, 1989; Ser. No. 795,382 filed Nov. 6, 1985, now U.S. Pat. No. 4,752,893; Ser. No. 804,204 filed Dec. 3, 1985, abandoned in favor of application Ser. No. 368,976, filed June 20, 1989; Ser. No. 804,203 filed Dec. 3, 1985, abandoned in favor of application Ser. No. 366,308, filed June 13, 1989; Ser. No. 821,375 filed Jan. 22, 1986, abandoned in favor of application Ser. No. 256,803, filed Oct. 11, 1988; Ser. No. 821,641 filed Jan. 23, 1986, abandoned in favor of application Ser. No. 346,388, filed Apr. 27, 1989; Ser. No. 821,634 filed Jan. 23, 1986, abandoned in favor of application Ser. No. 355,789, filed May 19, 1989; Ser. No. 821,644 filed Jan. 23, 1986, abandoned and to be revived and Ser. No. 821,667 filed Jan. 23, 1986, abandoned in favor of application Ser. No. 217,118, filed July 7, 1988; all of said applications copending.

BACKGROUND OF THE INVENTION

The present invention relates to the field of computer graphics. In particular, this invention relates to the field of bit mapped computer graphics in which the computer memory stores data for each individual picture element or pixel of the display at memory locations that correspond to the location of that pixel on the display. The field of bit mapped computer graphics has benefitted greatly from the lowered cost per bit of dynamic random access memory (DRAM). The lowered cost per bit of memory enables larger and more complex displays to be formed in the bit mapped mode.

The reduction in the cost per bit of memory and the consequent increase in the capacity of bit mapped computer graphics has led to the need for processing devices which can advantageously use the bit mapped memory in computer graphics applications. In particular, a type of device has arisen which includes the capacity to draw simple figures, such as lines and circles, under the control of the main processor of the computer. In addition, some devices of this type include a limited capacity for bit block transfer (known as BIT-BLT or raster operation) which involves the transfer of image data from one portion of memory to another, together with logical or arithmetic combinations of that data with the data at the destination location within the memory.

These bit-map controllers with hard wired functions for drawings lines and performing other basic graphics operations represent one approach to meeting the demanding performance requirements of bit maps displays. The built-in algorithms for performing some of the most frequently used graphics operations provides a way of improving overall system performance. However, a useful graphics system often requires many functions in addition to those few which are implemented in such a hard wired controller. These additional required functions must be implemented in software by the primary processor of the computer. Typically these hard wired bit-map controllers permit the processor only limited access to the bit-map memory, thereby limiting the degree to which software can augment the fixed set of functional capacities of the hard wired controller. Accordingly, it would be highly useful to be able to provide a more flexible solution to the problem of controlling the contents of the bit mapped memory, either by providing a more powerful graphics controller or by providing better access to this memory by the system processor, or both.

Such a controller would preferably have a wide internal and external data bus, so that the size of the data word upon which the desired data operations are performed may accordingly be large, resulting in increased speed of operation. However, the number of bits in such a data word which are directed to an individual screen element, or pixel, may be significantly fewer than the number of bits in the data word. Similarly, it is desirable for graphics applications to be able to modify individual stored bits in memory for a number of pixels without modifying the other bits in said pixels. It is also desirable to address a field of bits which may not coincide with the boundaries of the data word, and to modify the values stored in memory within said field without disturbing the stored contents of bits outside of the field boundary, but within the data word which is addressed to modify the desired field. Accordingly, a number of masks are useful in masking the bits within an addressed data word so that the bits which are not desired to be modified according to the operation executed by the controller are indeed not modified.

Prior controllers required a number of machine cycles to accomplish the masking and modifying steps necessary to modify certain bits within the data word while not modifying others. Such prior controllers had to temporarily store the original contents of the memory location in a register, and use the central processing unit to logically combine the new data word with, a mask register identifying the bits to be overwritten and the bits, not to be overwritten, and the original contents of the memory location were logically combined with the mask, in order to create a new data word that contained the new data in the desired bit positions and the original data in the desired bit positions. A number of instruction cycles were required for logical operations upon the three data words (original data, mask data, and new data), and the the loading and reading of temporary registers with the contents of the three data words and necessary intermediate results in the logical operation sequence. Accordingly, while prior controllers indeed could perform the bit-addressable functions, if such operations were to be performed on a large amount of data, for example on each pixel to be displayed on a video display, the performance of such prior controllers was unacceptable.

It is therefore an object of this invention to provide a data processing apparatus which can perform bit-addressable operations on a wide data word.

It is another object of this invention to provide such bit-addressable capability for a graphics controller.

It is another object of this invention to provide such a graphics controller which can modify individual bits within a display memory within a single read-modify-write memory access cycle.

It is another object of this invention to provide an input/output buffer circuit which can effect the masking operation, so that logical operations need not be performed by the central processing unit to effect such bit-addressable logical operations.

Other objects and advantages of the invention will be apparent to those of skill in the art, with reference to the following description and drawings.

SUMMARY OF THE INVENTION

The invention may be incorporated in a graphics controller, or other apparatus for data processing, which communicates data from the central processing unit (CPU) of the controller to a data bus, and thus to an addressable memory via the data bus. A mask data bus is provided which communicates one or more different masking functions, such as plane masking, and left and right masking, to the CPU data. The mask data bus has a number of bits, each of which is in a first logic state for each CPU data bit which is to be masked (i.e., the CPU data is not to be written to the memory), and a second logic state for each CPU data bit which is not to be masked (i.e., the CPU data is to be written to the memory). The CPU data is written into a plurality of latches, each latch corresponding to a bit of the data bus, during such time as the latches are isolated from the data bus. The contents of the destination memory location is presented on the data bus during such time as the latches are isolated from the data bus. The logic state of the mask data bus determines whether or not the latch is to be rewritten with the data read from the memory by connecting the data bus to the latch (for masked bits) or continuing the isolation (for unmasked bits). The results of the latches, whether rewritten or not rewritten, are then presented onto the data bus for writing into the memory. The masking function can be utilized for masking data stored in memory external from the controller by using external data terminals as the aforementioned data bus, and for masking data stored in internal memory by using the CPU data bus as the aforementioned data bus.

BRIEF DESCRIPTION OF THE DRAWINGS

These and other objects of the present invention will be readily understood from the following description, taken in conjunction with the drawings as described below.

FIG. 11 illustrates an example of the use of transparency.

FIG. 12 illustrates an example of the use of plane masking.

FIG. 19 illustrates an example of the use of the combination of transparency, plane masking, and field address masking.

DETAILED DESCRIPTION OF THE PREFERRED EMBODIMENT

Figure 1:
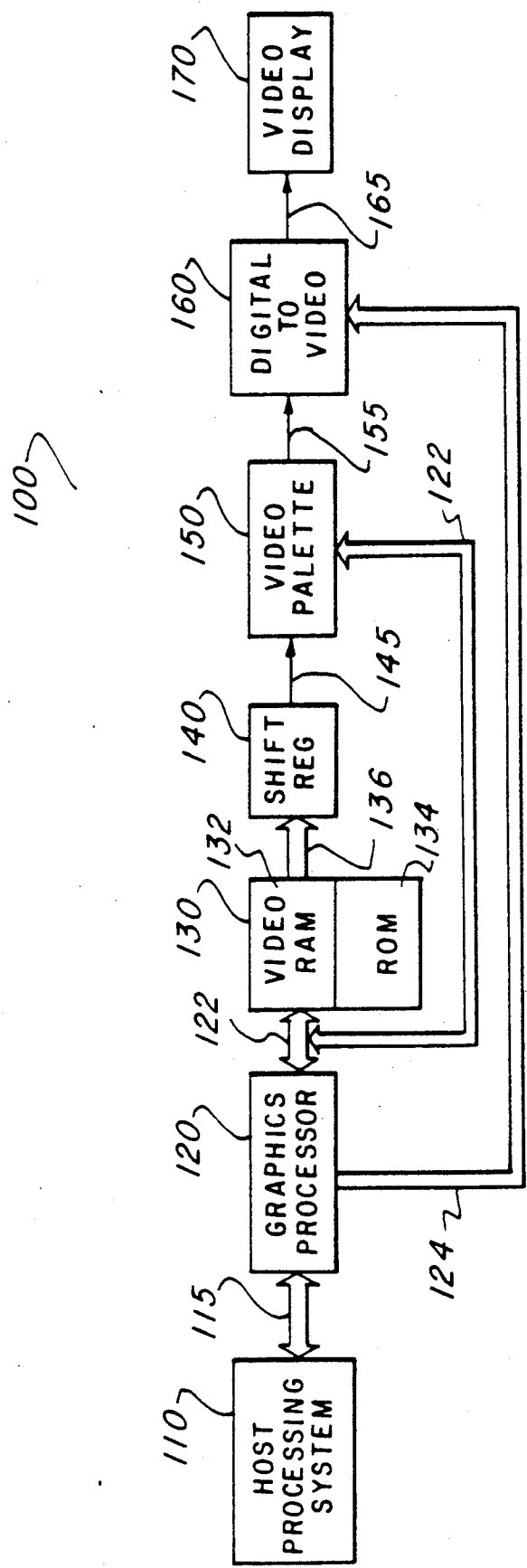
FIG. 1 illustrates a block diagram of a computer with graphics capability constructed in accordance with the principles of the present invention.

FIG. 1 illustrates a block diagram of graphics computer system 100 which is constructed in accordance with the principles of the present invention. Graphics computer system 100 includes host processing system 110, graphics processor 120, memory 130, shift register 140, video pallette 150, digital to video converter 160 and video display 170.

Host processing system 110 provides the major computational capacity for the graphics computer system 100. Host processing system 110 preferably includes at least one microprocessor, read only memory, random access memory and assorted peripheral devices for forming a complete computer system. Host processing system 110 preferably also includes some form of input device, such as a keyboard or a mouse, and some form of long term storage device such as a disk drive. The details of the construction of host processing system 110 are conventional in nature and known in the art, therefore the present application will not further detail this element. The essential feature of host processing system 110, as far as the present invention is concerned, is that host processing system 110 determines the content of the visual display to be presented to the user.

Graphics processor 120 provides the major data manipulation in accordance with the present invention to generate the particular video display presented to the user. Graphics processor 120 is bidirectionally coupled to host processing system 110 via host bus 115. In accordance with the present invention, graphics processor 120 operates as an independent data processor from host processing system 110, however, it is expected that graphics processor 120 is responsive to requests from host processing system 110 via host bus 115. Graphics processor 120 further communicates with memory 130, and video palette 150 via video memory bus 122. Graphics processor 120 controls the data stored within video RAM 132 via video memory bus 122. In addition, graphics processor 120 may be controlled by programs stored in either video RAM 132 or read only memory 134. Read only memory 134 may additionally include various types of graphic image data, such as alphanumeric characters in one or more font styles and frequently used icons. In addition, graphics processor 122 controls the data stored within video palette 150. This feature will be further disclosed below. Lastly, graphics processor 120 controls digital to video converter 160 via video control bus 124. Graphics processor 122 may control the line length and the number of lines per frame of the video image presented to the user by control of digital to video converter 160 via video control bus 124.

Video memory 130 includes video RAM 132 which is bidirectionally coupled to graphics processor 120 via video memory bus 122 and read only memory 134. As previously stated, video RAM 132 includes the bit mapped graphics data which controls the video image presented to the user. This video data may be manipulated by graphics processor 120 via video memory bus 122. In addition, the video data corresponding to the current display screen is output from video RAM 132 via video output bus 136. The data from video output bus 136 corresponds to the picture element to be presented to the user. In the preferred embodiment video RAM 132 is formed of a plurality of TMS4161 64K dynamic random access integrated circuits available from Texas Instruments Corporation, the assignee of the present application. The TMS4161 integrated circuit includes dual ports, enabling display refresh and display update to occur without interference.

Shift register 140 receives the video data from video RAM 130 and assembles it into a display bit stream. In accordance with the typical arrangement of video random access memory 132, this memory consists of a bank of several separate random access memory integrated circuits. The output of each of these integrated circuits is typically only a single bit wide. Therefore, it is necessary to assemble data from a plurality of these circuits in order to obtain a sufficiently high data output rate to specify the image to be presented to the user. Shift register 140 is loaded in parallel from video output bus 136. This data is output in series on line 145. Thus shift register 140 assembles a display bit stream which provides video data at a rate high enough to specify the individual dots within the raster scanned video display.

Video palette 150 receives the high speed video data from shift register 140 via bus 145. Video palette 150 also receives data from graphics processor 120 via video memory bus 122. Video palette 150 converts the data received on bus 145 into a video level output on bus 155. This conversion is achieved by means of a lookup table which is specified by graphics processor 120 via video memory bus 122. The output of video palette 150 may comprise color hue and saturation for each picture element or may comprise red, green and blue primary color levels for each pixel. The table of conversion from the code stored within video memory 132 and the digital levels output via bus 155 is controlled from graphics processor 120 via video memory bus 122.

Digital to video converter 160 receives the digital video information from video palette 150 via bus 155. Digital to video converter 160 is controlled by graphics processor 120 via video control bus 124. Digital to video converter 160 serves to convert the digital output of video palette 150 into the desired analog levels for application to video display 170 via video output 165. Digital to video converter 160 is controlled for a specification of the number of pixels per horizontal line and the number of lines per frame, for example, by graphics processor 120 via video controller bus 124. Data within graphics processor 120 controls the generation of the synchronization and blanking signals and the retrace signals by digital to video converter 160. These portions of the video signal are not specified by the data stored within video memory 132, but rather form the control signals necessary for specification of the desired video output.

Lastly, video display 170 receives the video output from digital to video converter 160 via video output line 165. Video display 170 generates the specified video image for viewing by the operator of graphics computer system 100. It should be noted that video palette 150, digital to video converter 160 and video display 170 may operate in accordance to two major video techniques. In the first, the video data is specified in terms of color hue and saturation for each individual pixel. In the other technique, the individual primary color levels of red, blue and green are specified for each individual pixel. Upon determination of the design choice of which of these major techniques to be employed, video palette 150, digital to converter 160 and video display 170 must be constructed to be compatible to this technique. However, the principles of the present invention in regard to the operation of graphics processor 120 are unchanged regardless of the particular design choice of video technique.

Figure 2:
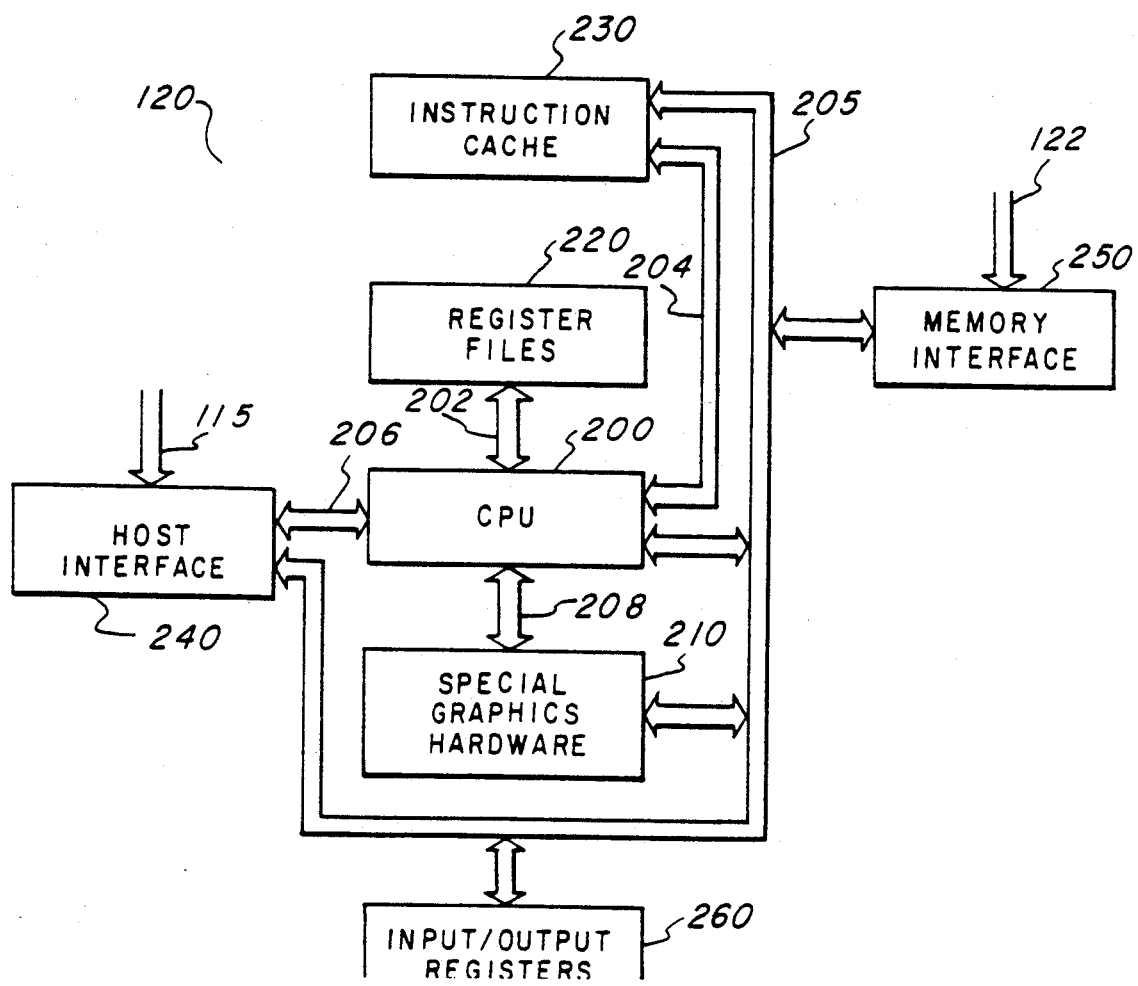
FIG. 2 illustrates the block diagram of a preferred embodiment of the graphics processing circuit of the present invention.

FIG. 2 illustrates graphics processor 120 in further detail. Graphics processor 120 includes central processing unit 200, special graphics hardware 210, register files 220, instruction cache 230, host interface 240, memory interface 250, input/output registers 260 and video display controller 270.

The heart of graphics processor 120 is central processing unit 200. Central processing unit 200 includes the capacity to do general purpose data processing including a number of arithmetic and logic operations normally included in a general purpose central processing unit. In addition, central processing unit 200 controls a number of special purpose graphics instructions, either alone or in conjunction with special graphics hardware 210.

Graphics processor 120 includes a major bus 205 which is connected to most parts of graphics processor 120 including the central processing unit 200. Central processing unit 200 is bidirectionally coupled to a set of register files, including a number of data registers, via bidirectional register bus 202. Register files 220 serve as the depository of the immediately accessible data used by central processing unit 200. As will be further detailed below, register files 220 includes in addition to general purpose registers which may be employed by central processing unit 200, a number of data registers which are employed to store implied operands for graphics instructions.

Central processing unit 200 is connected to instruction cache 230 via instruction cache bus 204. Instruction cache 230 is further coupled to general bus 205 and may be loaded with instruction words from the video memory 130 via video memory bus 122 and memory interface 250. The purpose of instruction cache 230 is to speed up the execution of certain functions of central processing unit 200. A repetitive function or function that is used often within a particular portion of the program executed by central processing unit 200 may be stored within instruction cache 230. Access to instruction cache 230 via instruction cache bus 204 is much faster than access to video memory 130. Thus, the program executed by central processing unit 200 may be speeded up by preliminarily loading the repeated or often used sequences of instructions within instruction cache 230. Then these instructions may be executed more rapidly because they may be fetched more rapidly. Instruction cache 230 need not always contain the same sets of instructions, but may be loaded with a particular set of instructions which will be often used within a particular portion of the program executed by central processing unit 200.

Host interface 240 is coupled to central processing unit 200 via host interface bus 206. Host interface 240 is further connected to the host processing system 110 via host system bus 115. Host interface 240 serves to control the communication between the host processing system 110 and the graphics processor 120. Host interface 240 controls the timing of data transfer between host processing system 110 and graphics processor 120. In this regard, host interface 240 enables either host processing system 110 to interrupt graphics processor 120 or vice versa enabling graphics processor 120 to interrupt host processing system 110. In addition, host interface 240 is coupled to the major bus 205 enabling the host processing system 110 to control directly the data stored within memory 130. Typically host interface 240 would communicate graphics requests from host processing system 110 to graphics processor 120, enabling the host system to specify the type of display to be generated by video display 170 and causing graphics processor 120 to perform a desired graphic function.

Central processing unit 200 is coupled to special graphics hardware 210 via graphics hardware bus 208. Special graphics hardware 210 is further connected to major bus 205. Special graphics hardware 210 operates in conjunction with central processing unit 200 to perform special graphic processing operations. Central processing unit 200, in addition to its function of providing general purpose data processing, controls the application of the special graphics hardware 210 in order to perform special purpose graphics instructions. These special purpose graphics instructions concern the manipulation of data within the bit mapped portion of video RAM 132. Special graphic hardware 210 operates under the control of central processing unit 200 to enable particular advantageous data manipulations regarding the data within video RAM 132.

Memory interface 250 is coupled to major bus 205 and further coupled to video memory bus 122. Memory interface 250 serves to control the communication of data and instructions between graphics processor 120 and memory 130. Memory 130 includes both the bit mapped data to be displayed via video display 170 and instructions and data necessary for the control of the operation of graphics processor 120. These functions include control of the timing of memory access, and control of data and memory multiplexing. In the preferred embodiment, video memory bus 122 includes multiplexed address and data information. Memory interface 250 enables graphics processor 120 to provide the proper output on video memory bus 122 at the appropriate time for access to memory 130.

Graphics processor 120 lastly includes input/output registers 260 and video display controller 270. Input/output registers 260 are bidirectionally coupled to major bus 205 to enable reading and writing within these registers. Input/output registers 260 are preferably within the ordinary memory space of central processing unit 200. Input/output registers 260 include data which specifies the control parameters of video display controller 270. In accordance with the data stored within the input/output registers 260, video display controller 270 generates the signals on video control bus 124 for the desired control of digital to video converter 160. Data within input/output registers 260 includes data for specifying the number of pixels per horizontal line, the horizontal synchronization and blanking intervals, the number of horizontal lines per frame and the vertical synchronization blanking intervals. Input/output registers 260 may also include data which specifies the type of frame interlace and specifies other types of video control functions. Lastly, input/output registers 260 is a depository for other specific kinds of input and output parameters which will be more fully detailed below.

Graphics processor 120 operates in two differing address modes to address memory 130. These two address modes are X Y addressing and linear addressing. Because the graphics processor 120 operates on both bit mapped graphic data and upon conventional data and instructions, different portions of the memory 130 may be accessed most conveniently via differing addressing modes. Regardless of the particular addressing mode selected, memory interface 250 generates the proper physical address for the appropriate data to be accessed. In linear addressing, the start address of a field is formed of a single multibit linear address. The field size is determined by data within a status register within central processing unit 200. In X Y addressing the start address is a pair of X and Y coordinate values. The field size is equal to the size of a pixel, that is the number of bits required to specify the particular data at a particular pixel.

Figure 3:
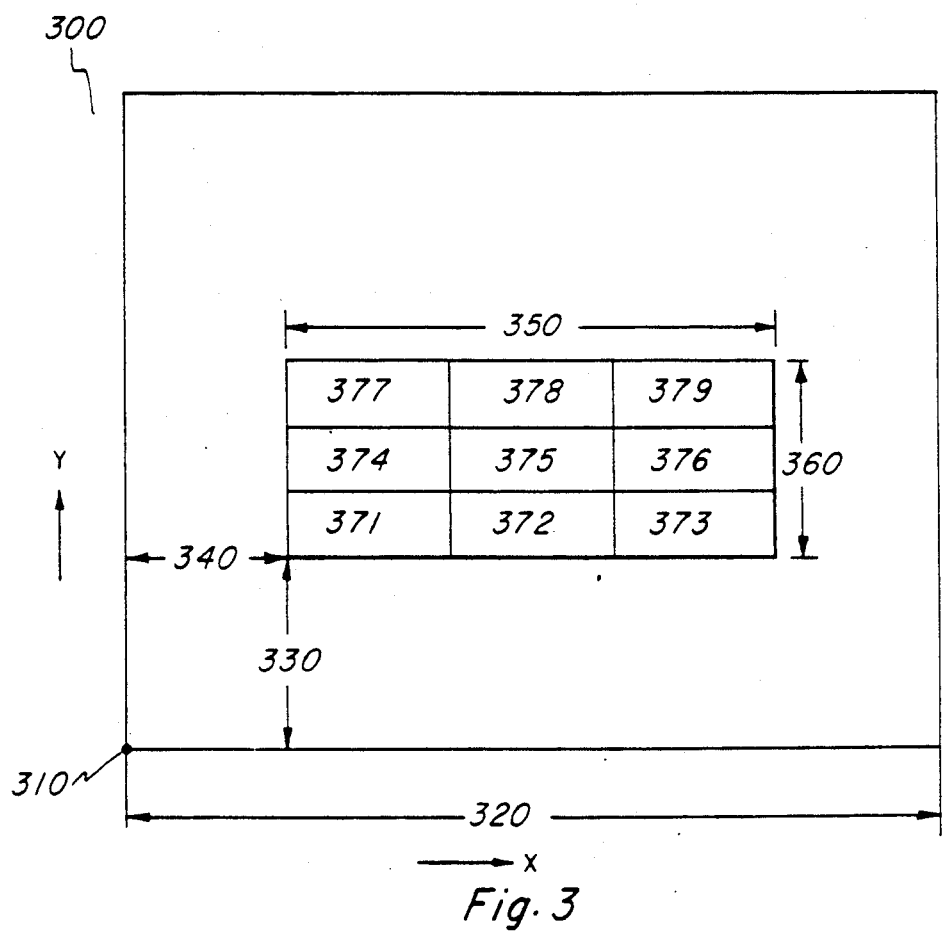
FIG. 3 illustrates the manner of specifying individual pixel addresses within the bit mapped memory in accordance with the X Y addressing technique.
Figure 4:
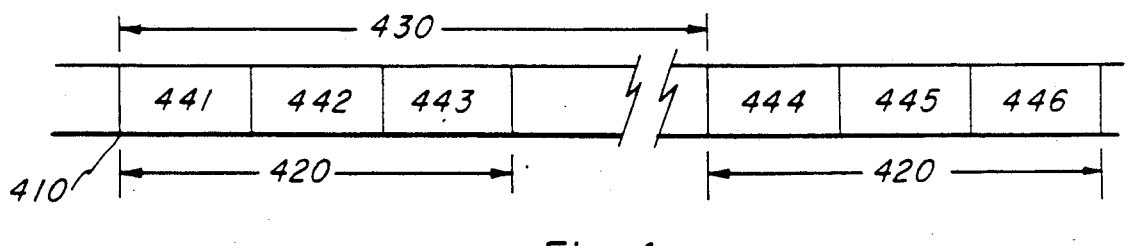
FIG. 4 illustrates a manner of specifying field addresses in accordance with the linear addressing technique.

FIG. 3 illustrates the arrangement of pixel data in accordance with an X Y addressing mode. Similarly, FIG. 4 illustrates the arrangement of similar data in accordance with the linear addressing mode. FIG. 3 shows origin 310 which serves as the reference point of the X Y matrix of pixels. The origin 310 is specified as a X Y start address and need not be the first address location within memory. The location of data corresponding to an array of pixels, such as a particular defined image element is specified in relation to the origin address 310. This includes an X start address 340 and a Y start address 330. Together with the origin, X start address 340 and Y start address 330 indicates the starting address of the first pixel data 371 of the particular image desired. The width of the image in pixels is indicated by a quantity delta X 350. The height of the image in pixels is indicated by a quantity delta Y 360. In the example illustrated in FIG. 3, the image includes nine pixels labeled 371 through 379. The last parameter necessary to specify the physical address for each of these pixels is the screen pitch 320 which indicates the width of the memory in number of bits. Specification of these parameters namely X starting address 340, Y starting address 330, delta X 350, delta Y 360 and screen pitch 320 enable memory interface 250 to provide the specified physical address based upon the specified X Y addressing technique.

FIG. 4 similarly illustrates the organization of memory in the linear format. A set of fields 441 to 446, which may be the same as pixels 371 through 376 illustrated in FIG. 3, is illustrated in FIG. 4. The following parameters are necessary to specify the particular elements in accordance with the linear addressing technique. Firstly, is the start address 410 which is the linear start address of the beginning of the first field 441 of the desired array. A second quantity delta X 420 indicates the length of a particular segment of fields in number of bits. A third quantity delta Y (not illustrated in FIG. 4) indicates the number of such segments within the particular array. Lastly, linear pitch 430 indicates the difference in linear start address between adjacent array segments. As in the case of X Y addressing, specification of these linear addressing parameters enables memory interface 250 to generate the proper physical address specified.

The two addressing modes are useful for differing purposes. The X Y addressing mode is most useful for that portion of video RAM 132 which includes the bit map data, called the screen memory which is the portion of memory which controls the display. The linear addressing mode is most useful for off screen memory such as for instructions and for image data which is not currently displayed. This latter category includes the various standard symbols such as alphanumeric type fonts and icons which are employed by the computer system. It is sometimes desirable to be able to convert an X Y address to a linear address. This conversion takes place in accordance with the following formula:

$$LA = OFF + (Y \times SP) + (X \times PS)$$

Where: LA is the linear address; OFF is the screen offset, the linear address of the origin of the X Y coordinate system; Y is the Y address; SP is the screen pitch in bits; X is the X address; and PS is the pixel size in bits. Regardless of which addressing mode is employed, memory 250 generated the proper physical address for access to memory 130.

Figure 5:
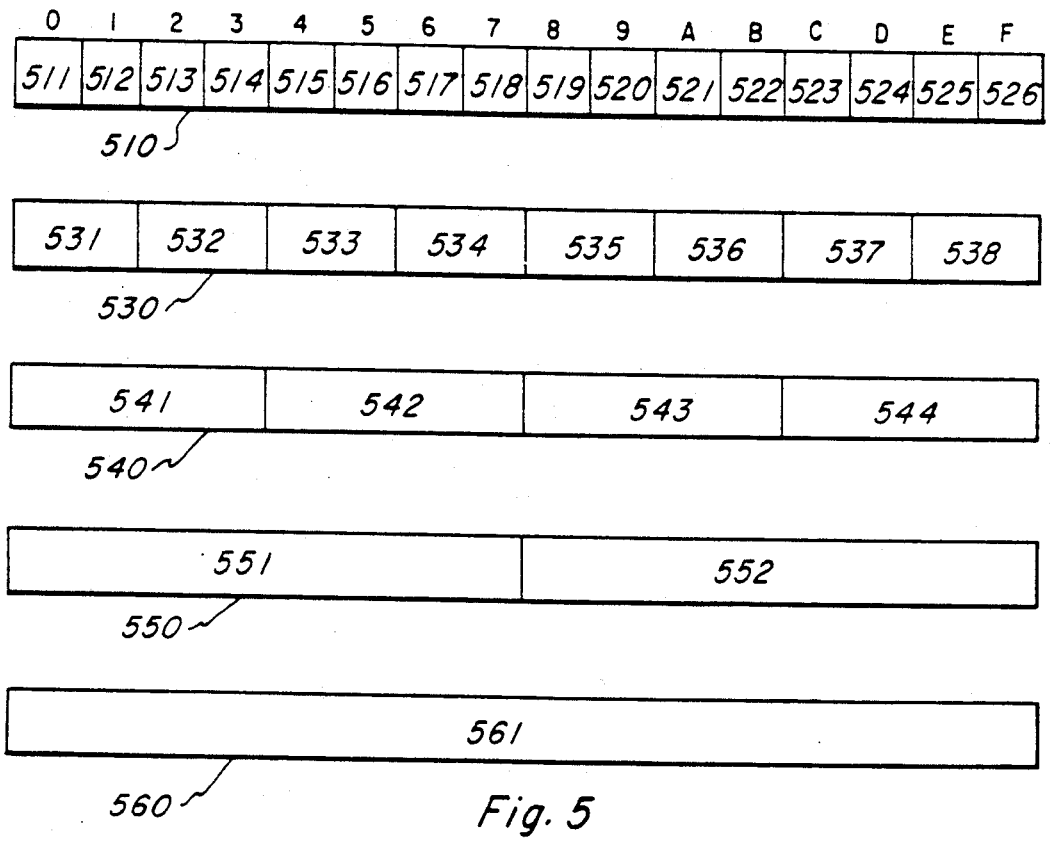
FIG. 5 illustrates the preferred embodiment of storage of pixel data of varying lengths within a single data word in accordance with the preferred embodiment of the present invention.

FIG. 5 illustrates the manner of pixel storage within data words of memory 130. In accordance with the preferred embodiment of the present invention, memory 130 consists of data words of 16 bits each. These 16 bits are illustrated schematically in FIG. 5 by the hexadecimal digits 0 through F. In accordance with the preferred embodiment of the present invention, the number of bits per pixel within memory 130 is an integral power of 2 but no more than 16 bits. As thus limited, each 16 bit word within memory 130 can contain an integral number of such pixels. FIG. 5 illustrates the five available pixel formats corresponding to pixel lengths of 1, 2, 4, 8 and 16 bits. Data word 510 illustrates 16 one bit pixels 511 to 516 thus 16 one bit pixels may be disposed within each 16 bit word. Data word 530 illustrates 8 two bit pixels 531 to 538 which are disposed within the 16 bit data word. Data word 540 illustrates 4 four bit pixels 541 to 544 within the 16 bit data word. Data word 550 illustrates 2 eight bit pixels 551 and 552 within the 16 bit word. Lastly, data word 560 illustrates a single 16 bit pixel 561 stored within the 16 bit data word. By providing pixels in this format, specifically each pixel having an integral power of two number of bits and aligned with the physical word boundaries, pixel manipulation via graphics processor 120 is enhanced. This is because processing each physical word manipulates an integral number of pixels. It is contemplated that within the portion of video RAM 132 which specifies the video display that a horizontal line of pixels is designated by a string of consecutive words such as illustrated in FIG. 5.

Figure 6:
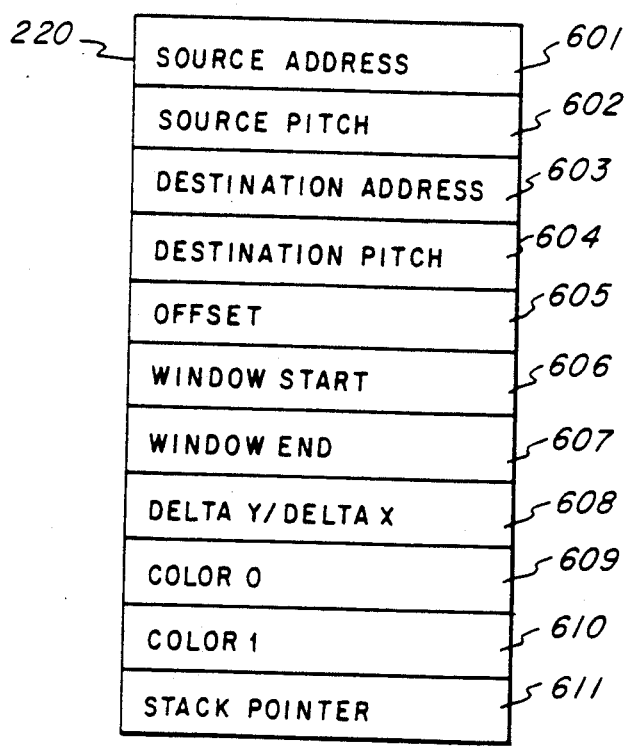
FIG. 6 illustrates the arrangement of contents of implied operands stored within the register memory in accordance with the preferred embodiment of the present invention.

FIG. 6 illustrates the contents of some portions of register files 220 which store implied operands for various graphics instructions. Each of the registers 601 through 611 illustrated in FIG. 6 are within the register address space of central processing unit 200 of graphics processor 120. Note, these register files illustrated in FIG. 6 are not intended to include all the possible registers within register files 220. On the contrary, a typical system will include numerous general purpose undesignated registers which can be employed by central processing unit 200 for a variety of program-specified functions.

Register 601 stores the source address. This is the address of the lower left corner of the source array. This source address is the combination of X address 340 and Y address 330 in the X Y addressing mode or the linear start address 410 in the linear addressing mode.

Register 602 stores the source pitch or the difference in linear start addresses between adjacent rows of the source array. This is either screen pitch 340 illustrated in FIG. 3 or linear pitch 430 illustrated in FIG. 4 depending upon whether the X Y addressing format or the linear addressing format is employed.

Registers 603 and 604 are similar to registers 601 and 602, respectively, except that these registers include the destinations start address and the destination pitch. The destination address stored in register 603 is the address of the lower left hand corner of the destination array in either X Y addressing mode or linear addressing mode. Similarly, the destination pitch stored in register 604 is the difference in linear starting address of adjacent rows, that is either screen pitch 320 or linear pitch 430 dependent upon the addressing mode selected.

Register 605 stores the offset. The offset is the linear bit address corresponding to the origin of the coordinates of the X Y address scheme. As mentioned above, the origin 310 of the X Y address system does not necessarily belong to the physical starting address of the memory. The offset stored in register 605 is the linear start address of the origin 310 of this X Y coordinate system. This offset is employed to convert between linear and X Y addressing.

Registers 606 and 607 store addresses corresponding to a window within the screen memory. The window start stored in register 606 is the X Y address of the lower left hand corner of a display window. Similarly, register 607 stores the window end which is the X Y address of the upper right hand corner of this display window. The addresses within these two registers are employed to determine the boundaries of the specified display window. In accordance with the well known graphics techniques, images within a window within the graphics display may differ from the images of the background. The window start and window end addresses contained in these registers are employed to designate the extent of the window in order to permit graphic processor 120 to determine whether a particular X Y address is inside or outside of the window.

Register 608 stores the delta Y/delta X data. This register is divided into two independent halves, the upper half (higher order bits) designating the height of the source array (delta Y) and the lower half (lower order bits) designating the width of the source array (delta X). The delta Y/delta X data stored in register 608 may be provided in either the X Y addressing format or in the linear addressing format depending upon the manner in which the source array is designated. The meaning of the two quantities delta X and delta Y are discussed above in conjunction with FIGS. 3 and 4.

Registers 609 and 610 each contain pixel data. Color 0 data stored in register 609 contains a pixel value replicated throughout the register corresponding to a first color designated color 0. Similarly, color 1 data stored in register 610 includes a pixel value replicated throughout the register corresponding to a second color value designated color 1. Certain of the graphics instructions of graphics processor 120 employ either or both of these color values within their data manipulation. The use of these registers will be explained further below.

Lastly, the register file 220 includes register 611 which stores the stack pointer address. The stack pointer address stored in register 611 specifies the bit address within video RAM 132 which is the top of the data stack. This value is adjusted as data is pushed onto the data stack or popped from the data stack. This stack pointer address thus serves to indicate the address of the last entered data in the data stack.

Figure 7:
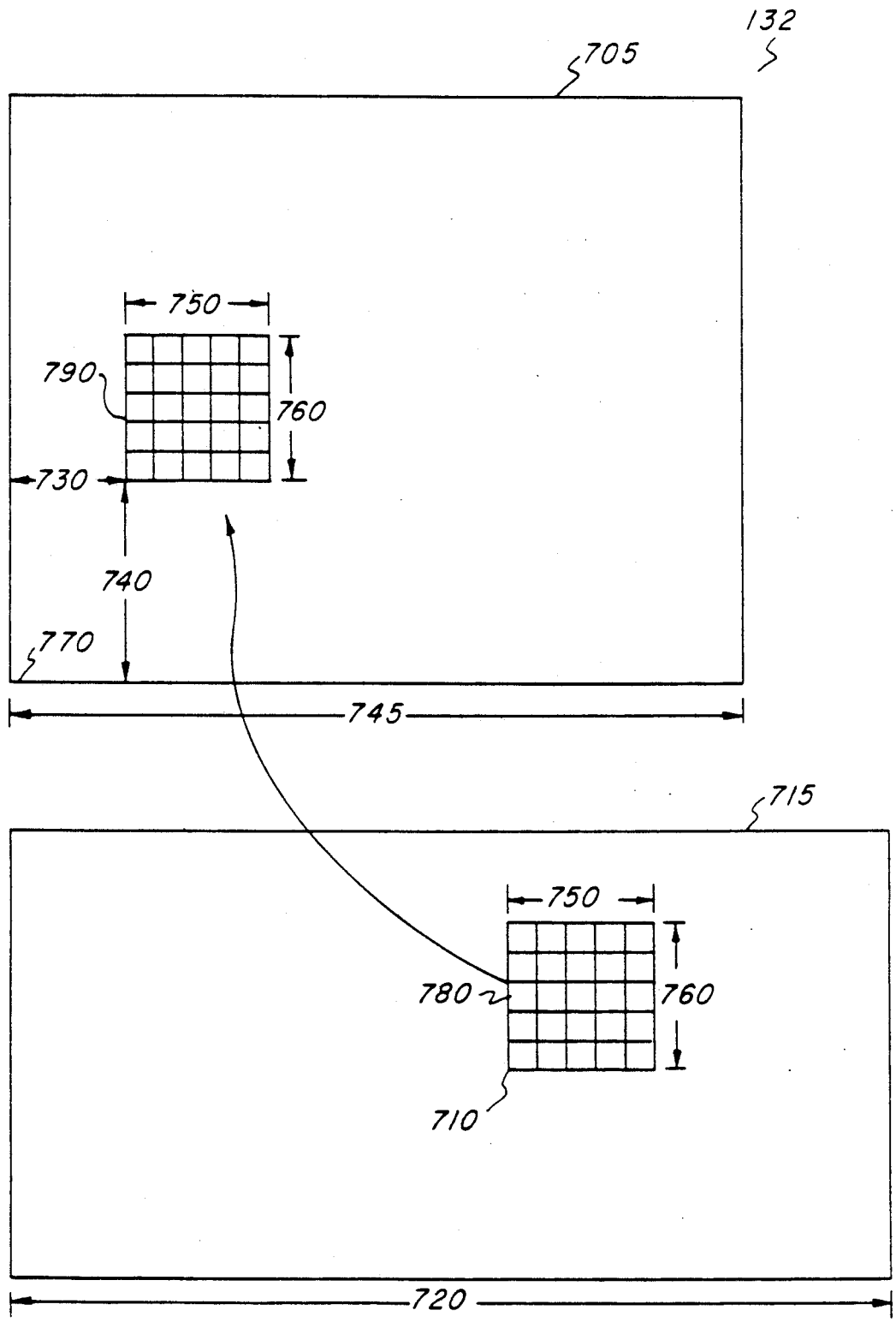
FIG. 7 illustrates the characteristics of an array move operation within the bit mapped memory of the present invention.

FIG. 7 illustrates in schematic form the process of an array move from off screen memory to screen memory. FIG. 7 illustrates video RAM 132 which includes screen memory 705 and off screen memory 715. In FIG. 7 an array of pixels 780 (or more precisely the data corresponding to an array of pixels) is transferred from off screen memory 715 to screen memory 705 becoming an array of pixels 790.

Prior to the performing the array move operation certain data must be stored in the designated resisters of register files 220. Register 601 must be loaded with the beginning address 710 of the source array of pixels. In the example illustrated in FIG. 7 this is designated in linear addressing mode. The source pitch 720 is stored in register 602. Register 603 is loaded with the destination address. In the example illustrated in FIG. 7 this is designated in X Y addressing mode including X address 730 and Y address 740. Register 604 has the destination pitch 745 stored therein. The linear address of the origin of the X Y coordinate system, offset address 770, is stored in register 605. Lastly, delta Y 750 and delta X 760 are stored in separate halves of register 608.

The array move operation illustrated schematically in FIG. 7 is executed in conjunction with the data stored in these registers of register file 220. In accordance with the preferred embodiment the number of bits per pixel is selected so that an integral number of pixels are stored in a single physical data word. By this choice, the graphics processor may transfer the array of pixels 780 to the array of pixels 790 largely by transfer of whole data words. Even with this selection of the number of bits per pixel in relation to the number of bits per physical data word, it is still necessary to deal with partial words at the array boundaries in some cases. However, this design choice serves to minimize the need to access and transfer partial data words.

In accordance with the preferred embodiment of the present invention, the data transfer schematically represented by FIG. 7 is a special case of a number of differing data transformations. The pixel data from the corresponding address locations of the source image and the destination image are combined in a manner designated by the instruction. The combination of data may be a logical function (such as AND or OR) or it may be an arithmetic function (such as addition or subtraction). The new data thus stored in the array of pixels 790 is a function of both the data of the array of pixels 780 and the current data of pixels 790. The data transfer illustrated in FIG. 7 is only a special case of this more general data transformation in which the data finally stored in the destination array does not depend upon the data previously stored there.

Figure 8:
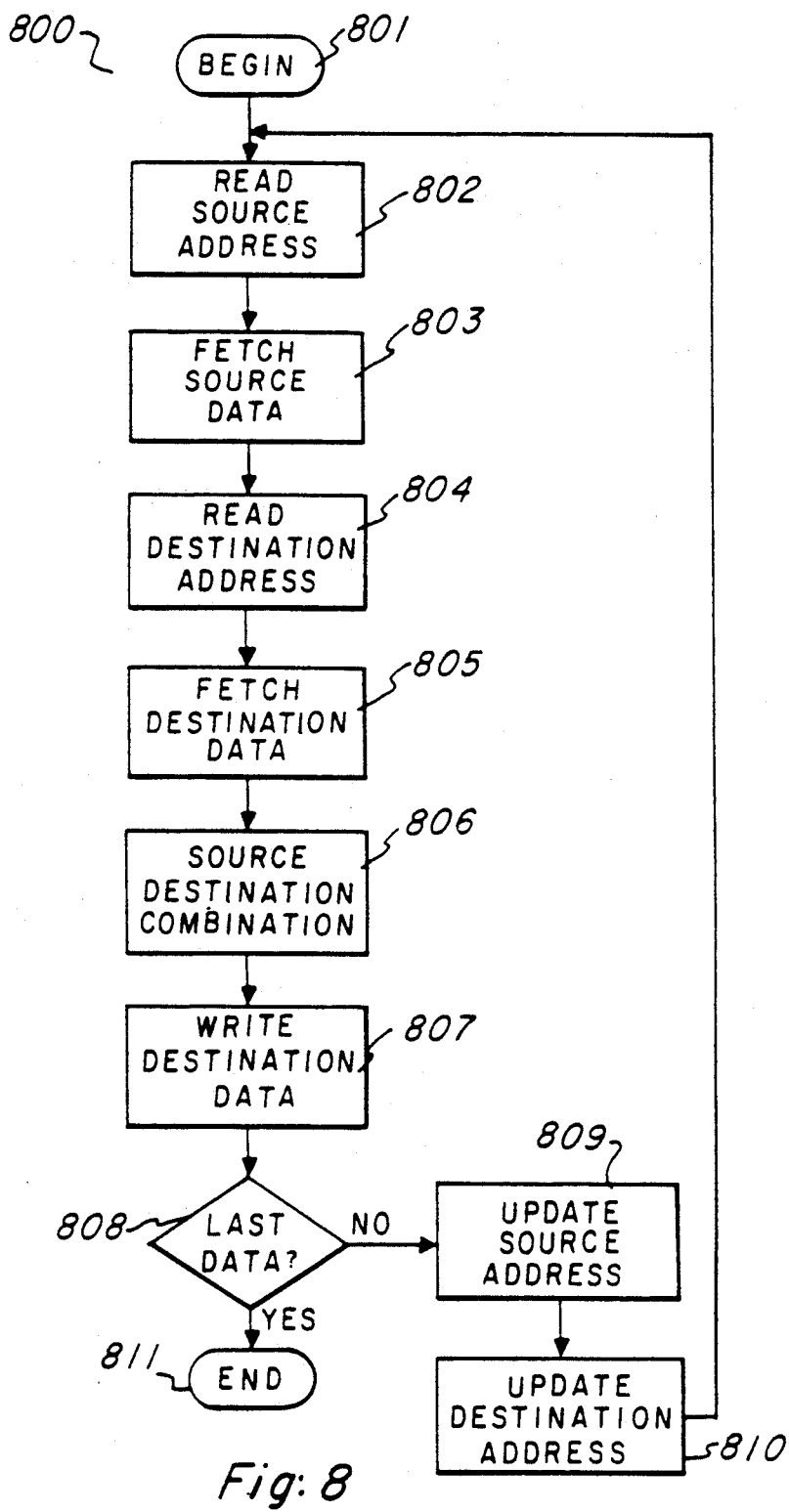
FIG. 8 illustrates a flow chart of a bit block transfer or array move operation in accordance with the present invention.

This process is illustrated by the flow chart in FIG. 8. In accordance with the preferred embodiment the transfer takes place sequentially by physical data words. Once the process begins (start block 801) the data stored in the register 601 is read to obtain the source address (processing block 802). Next graphics processor 120 fetches the indicated physical data word from memory 130 corresponding to the indicated source address (processing block 803). In the case that the source address is specified in the X Y format, this recall of data would include the steps of converting the X Y address into the corresponding physical address. A similar process of recall of the destination address from register 603 (processing block 804) and then fetching of the indicated physical data word (processing block 805) takes place for the data contained at the destination location.

This combined data is then restored in the destination location previously determined (processing block 806). The source and destination pixel data are then combined in accordance with the combination mode designated by the particular data transfer instruction being executed. This is performed on a pixel by pixel basis even if the physical data word includes data corresponding to more than one pixel. This combined data is then written into the specified destination location (processing block 807).

In conjunction with the delta Y/delta X information stored in register 608, graphics processor 120 determines whether or not the entire data transfer has taken place (decision block 808) by detecting whether the last data has been transferred. If the entire data transfer has not been performed, then the source address is updated. In conjunction with the source address previously stored in register 601 and the source pitch data stored in register 602 the source address stored in register 601 is updated to refer to the next data word to be transferred (processing block 809). Similarly, the destination address stored in register 603 is updated in conjunction with the destination pitch data stored in register 604 to refer to the next data word in the destination (processing block 810). This process is repeated using the new source stored in register 601 and the new destination data stored in register 603.

As noted above the delta Y/delta X data stored in register 608 is used to define the limits of the image to be transferred. When the entire image has been transferred as indicated with reference to the delta Y/delta X data stored in register 608 (decision block 808), then the instruction execution is complete (end block 811) and graphics processor 120 continues by executing the next instruction in its program. As noted, in the preferred embodiment this process illustrated in FIG. 8 is implemented in instruction microcode and the entire data transformation process, referred to as an array move, is performed in response to a single instruction to graphics processor 120.

Figure 9:
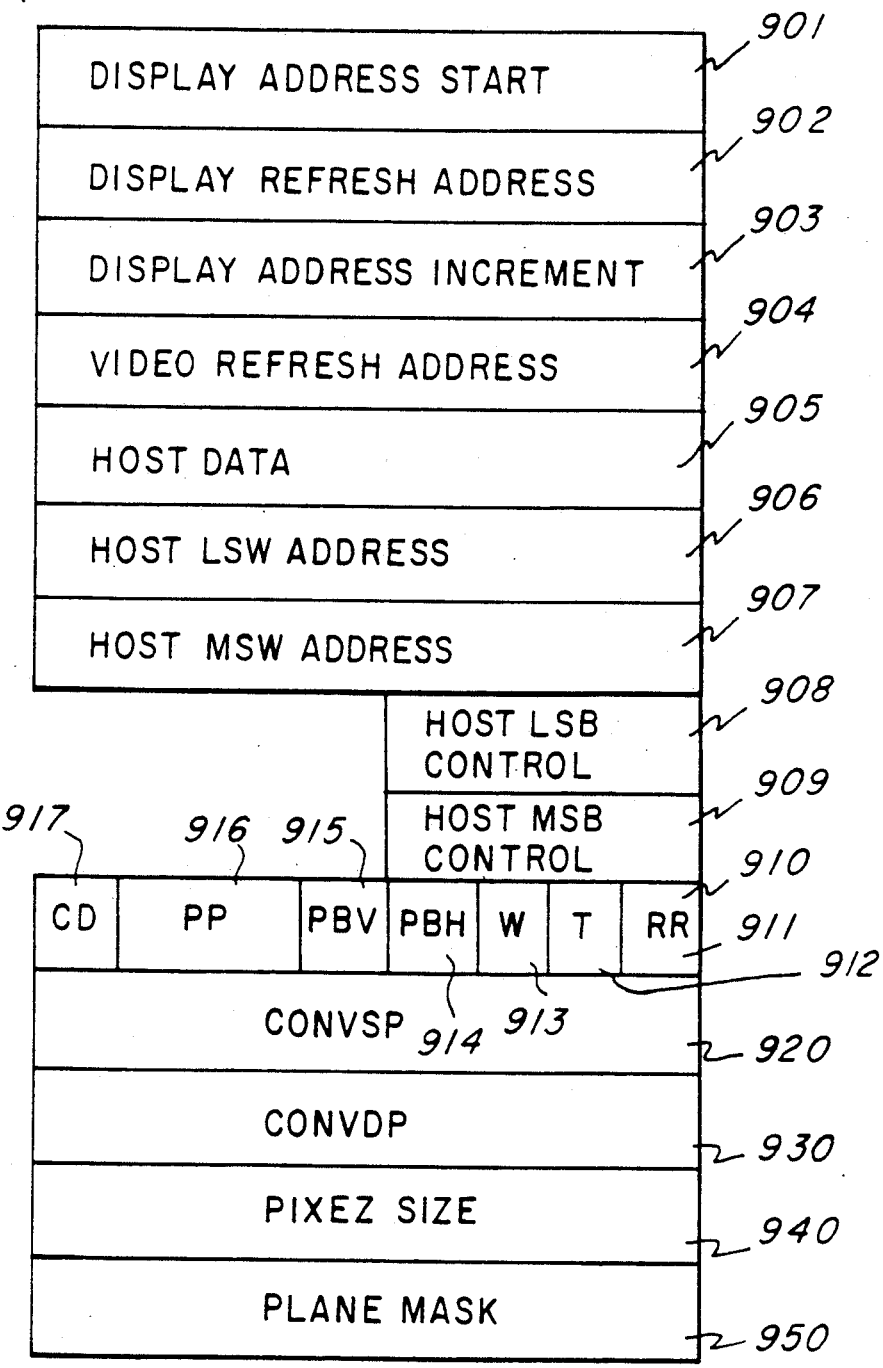
FIG. 9 illustrates some of the input/output registers employed in the preferred embodiment of the present invention.

FIG. 9 illustrates a portion of input/output registers 260 which is employed to store data relevant to the transparency operations of the present invention. Firstly, input/output registers 260 include registers 901 to 910 which are dedicated to the storage of information relevant to input/output control. Register 901 stores the display address start. Register 902 stores the display refresh address. Register 903 stores the display address increment. Together these three registers control the portion of video RAM 132 which specifies the video display. The display address start stored in register 901 is the starting address within video RAM 132 where the memory specifying the video display begins. At the start of each new frame of display, the data within register 901 is loaded into register 902 to define the display refresh address. The display refresh address stores the next to be read portion of video RAM 132 necessary to define the video display. This address is generally the beginning address of a line of the video scan. During each horizontal retrace interval the data stored in register 903 corresponding to the display address increment is added to the data stored within register 902 thereby forming the next display refresh address. This process continues until the end of that particular video frame at which time the register 902 is again loaded with the display address start from register 901.

Figure 16A:
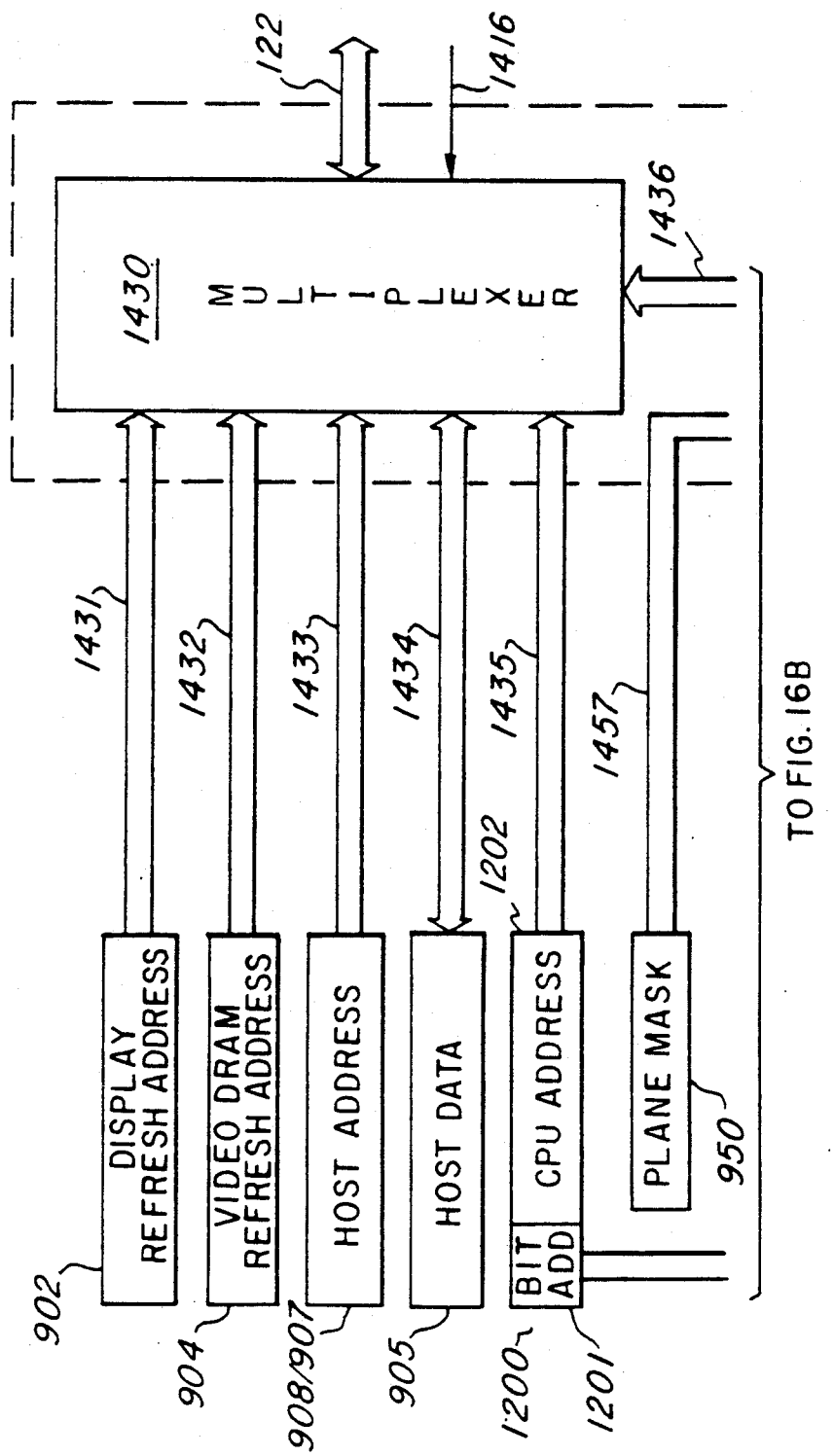
FIG. 16 illustrates the structure of the memory access controller in accordance with the preferred embodiment of the present invention.
Figure 16B:
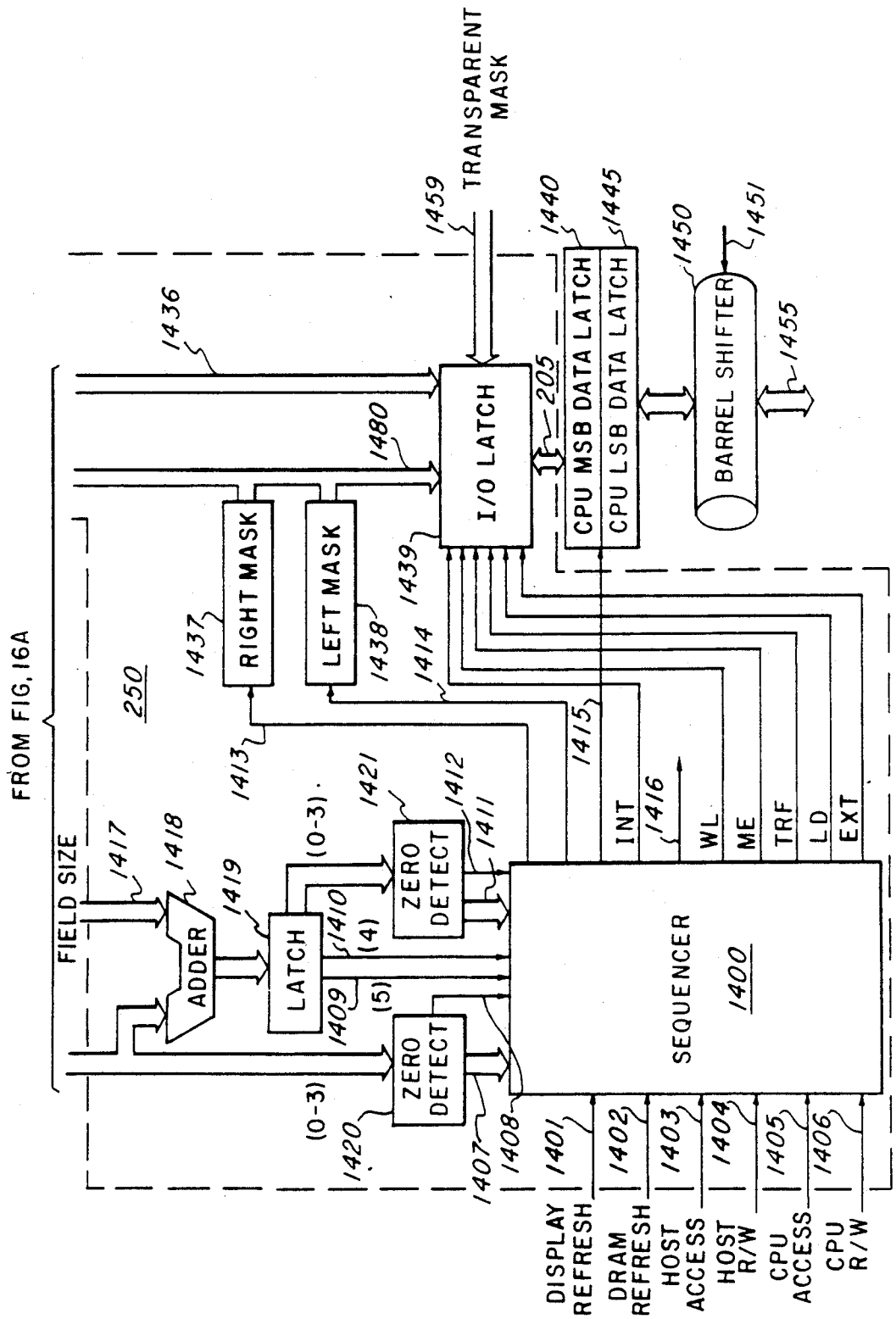

Register 904 of input/output registers 260 stores the video RAM refresh address. In a typical system such as illustrated in FIG. 1, video RAM 132 is composed of dynamic random access memory. This memory much be periodically refreshed in order to retain the stored information. The video RAM refresh address stored in register 904 is the next row address to be refreshed. In accordance with principles well known in the art, this row address in applied to video RAM 132 in conjunction with a refresh signal, thereby refreshing all of the columns in the selected row. Once this has been achieved then the data within register 904 is incremented to the next row. Thus the video RAM refresh address corresponds to the next row to be refreshed. The hardware for generating the dynamic random access memory refresh request is illustrated in FIG. 16.

Registers 905, 906, 907, 908 and 909 enable the host processing system 110 to directly access memory 130. This is achieved by providing host data in register 905 and the host least significant word address in register 906 and the host most significant word address in register 907. These three registers serve to enable host processing system 110 to write to or read from memory 130 via memory interface 250. This is achieved from control signals from host processing system 110 and the data stored in registers 908 and 909 which store the host least significant control bits and the host most significant control bits, respectively. In the preferred embodiment, these two registers are 8 bits wide, where as the other registers 260 are 16 bits wide. The provision of these two 8 bits wide registers will enable a host processing system 110 which operates on an 8 bit external bus to directly read or write to each of these registers in a single memory cycle. On the other hand, since the graphics processor 120 services a 16 bit wide external data bus, these two registers may be written to or read from in a single memory cycle.

Input/output registers 260 further includes register 910 which stores a control word. This control word is used to specify types of operations performed by central processing unit 210. The control word stored in register 910 includes a refresh rate section 911, transparency enable/disable section 912, a windowing option section 913, a pixel block horizontal direction control section 914, a pixel block transfer vertical direction control section 915, a pixel processing section 916 and a cache enable/disable section 917. The purpose and effect of these sections of the control word will be described below.

The refresh rate portion 911 is two bits which define the refresh rate of the dynamic random access memory forming video RAM 132. Table 1 illustrates the preferred embodiment of this refresh rate portion 911. Note that the dynamic random access memory may be updated once each 32 or 64 instructions cycles of graphics processor 120, or refresh may be suspended depending upon the state of this bits. The particular refresh rate selected depends upon the application to which the graphics processor 120 is adapted. It should be noted, however, that the no refresh option should not be set for more than a short period of time in order to ensure the integrity of data stored within memory 130.

TABLE 1

| RR | Bits | Refresh Rate |
|---|---|---|
| 0 | 0 | 32 Clock Cycles |
| 0 | 1 | 64 Clock Cycles |
| 1 | 0 | Unused |
| 1 | 1 | No DRAM Refresh |

A single bit within register 910 is used to indicate whether or not the transparency operation is enabled. This single bit is the transparency enable/disable section 912. If this bit is "1" then transparency is enabled. In such a case the special graphics hardware 210 tests for source pixels which are transparent. In the preferred embodiment these pixels are all "0's". If such pixels are detected then the corresponding destination pixel is unchanged regardless of the source destination combination selected. If this bit is "0", then transparency is disabled. In such an event, the source destination combination is formed for transparent pixels in a manner like any other pixel. Thus by proper setting or resetting of this particular bit within register 910, the transparency operation may be enabled or disabled.

Control register 910 includes a window violation control portion 913. This window violation control portion preferably includes two bits. Depending upon the state of these two bits graphics processor 120 performs differing windowing functions. These differing windowing functions are implied in the case of an array move such as illustrated in FIG. 8. If these two windowing function bits are "00" then no windowing takes place. If these windowing violation bits are "10", then an interrupt is generated if a window violation occurs. In this case, the source pixel is moved to its destination only if it lies within the window defined by the window start and window end data stored within register files 220. If the destination is outside of the window, then an interrupt is generated and the array move is aborted. Lastly, if the window violation bits are "11", then a windowed move occurs. The source pixel is moved only if its destination lies within the window. If the destination lies outside the window, then that particular pixel move is aborted. However, other pixels within the same array move will be transferred normally, if their destinations are within the window. Thus, in the array move the destination is truncated to fit within the window and only those pixels within the window are transferred. Table 2 is a summary of the window violation control codes.

TABLE 2

| W | Bits | Windowing Action |
|---|------|------------------|
| 0 | 0 | Windowing Disabled |
| 0 | 1 | Unused |
| 1 | 0 | Interrupt on Window Violation |
| 1 | 1 | Inhibit Pixel Write on Window Violation Other Pixels Unaffected |

Register 910 includes sections 914 and 915 which indicate the direction of movement of the pixel block transfer operation. Section 914 stores the pixel block transfer horizontal control bit (PBH) which sets the direction of horizontal movement. If the pixel block transfer horizontal control bit is "0" then the X coordinate is incremented. This corresponds to movement from left to right. If the pixel block transfer horizontal control bit is "1" then the X coordinate is decremented causing movement from right to left. Section 915 stores the pixel block transfer vertical control bit (PBV) which indicates the direction of vertical movement. This is defined similarly to the horizontal control. A "0" causes the Y coordinate to be incremented causing movement from top to bottom. A "1" causes the Y coordinate to be decremented causing movement from bottom to top.

Pixel processing section 916 of within the control word stored in register 910 specifies the type of source destination combination performed during array moves. As noted in regards to FIG. 8 and in particular to processing block 806, this combination of source and pixel data may include various logic and arithmetic functions. The relationship between the state of the pixel processing section 911 and the source destination combination performed during a pixel array move is shown in Table 3.

TABLE 3

| PP | Operation | Description |
|----|-----------|-------------|
| | Logical Combinations | |
| 00000 | S → D | Replace Destination with Source |
| 00001 | D AND S → D | AND Source with Destination |
| 00010 | D− AND S → D | AND Source with NOT Destination |
| 00011 | 0 → D | Replace Destination with zeros |
| 00100 | D XOR S− → D | XOR NOT Source with Destination |
| 00101 | D AND S− → D | AND NOT Source with Destination |
| 00110 | D− → D | Negate Destination |
| 00111 | D NOR S → D | NOR Source with Destination |
| 01000 | D OR S → D | OR Source with Destination |
| 01001 | D → D | No operation |
| 01010 | D XOR S → D | XOR Source with Destination |
| 01011 | D AND S− → D | AND NOT Source with Destination |
| 01100 | 1 → D | Replace Destination with ones |
| 01101 | D OR S− → D | OR NOT Source with Destination |
| 01110 | D NAND S → D | NAND Source with Destination |
| 01111 | S− → D | Replace Destination with NOT Source |
| | Arithmetic Combinations | |
| 10000 | D + S → D | Add Source to Destination |
| 10001 | ADDS (D,S) → D | Add S to D with Saturation |
| 10010 | D − S → D | Subtract Source from Destination |
| 10011 | SUBS (D,S) → D | Subtract S from D with Saturation |
| 10100 | MAX (D,S) → D | Maximum of Source and Destination |

TABLE 3-continued

| PP | Operation | Description |
|----|-----------|-------------|
| 10101 | MIN (D,S) → D | Minimum of Source and Destination |

The last section of register 910 stores the cache enable/disable bit 917. If this bit is "0" then the instruction cache 230 is enabled. If an instruction is already loaded in the cache then it is executed from the cache without reading the requested instruction from memory 130. If the instruction is not in the cache, then that instruction together with the next three instructions are fetched from memory 130 and stored in instruction cache 230. This operation is controlled by memory interface 250 and occurs without the direct control of central processing unit 200. On the other hand, if the cache enable/disable bit is "1", then the instruction cache is disabled. In that case each requested instruction is individually recalled from memory 130 when requested.

Registers 920 and 930 are employed to store data which is useful in converting between X Y and linear addresses. CONVSP data stored in register 920 is a precalculated factor employed to enable conversion from X Y addressing to linear addressing for screen pitch. This factor is:

$$16 + \log_2(\text{screen pitch})$$

In a similar fashion, the data CONVLP stored in register 930 is employed for conversion between X Y addressing and linear addressing for the linear pitch. This data corresponds to:

$$16 + \log_2(\text{linear pitch})$$

Storing this data in registers 920 and 930 in this manner enables central processing unit 200 to readily access this data in order to quickly implement the conversions between X Y addressing and linear addressing.

Register 940 has the pixel size data stored therein. The pixel size data indicates the number of bits per pixel within the displayable portion of video RAM 132. As previously noted in conjunction with FIG. 5, the pixel size is constrained by the preferred word size. In the preferred embodiment, the graphics processor of the present invention operates on 16 bit data words. The number of bits per pixel is constrained in the preferred embodiment to be an integral factor of 16, the number of bits per word. Thus, the number of bits per word could be one, two, four, eight or sixteen. Register 940 stores pixel size data which equals the number of bits per word selected. Thus, if a single bit per word has been selected, register 940 stores the numerical data 1. Similarly, if two-bit per pixel has been selected, then register 940 stores numerical data equal to 2. Likewise, other possible numbers of bits per pixel are indicated by the numeric values stored within register 940. This pixel size data is employed by CPU 200 and special graphics hardware 210 in executing various instructions, in particular the transparency operation to be discussed further below.

Register 950 stores a plane priority mask which is employed in raster operations. Register 950 stores a bit mask which defines which portions of each pixel color code are to be actively modified during an array move operation such as illustrated in FIG. 8. In the preferred embodiment the number of bits per pixel, i.e. the pixel size, is limited to an integral fraction of the physical data word employed by the graphics data processing apparatus. Therefore register 950 includes an integral number of sets of bits equal to the pixel size. In accordance with the preferred embodiment, register 910 includes the plane mask, which is equal in length to the pixel size, replicated throughout the register. In the plane mask "1" bits correspond to bits within the pixel color code which are to be written into the destination location and "0" bits correspond to bits which are to be unchanged in the destination location. This permits only part of the pixel color code to be modified by a raster operation. This feature is useful when the pixel color codes represent a number of separable attributes, such as red, blue and green color intensities. Plane masking can be disabled by setting register 950 to all "1's" thereby assuring that all pixels of the destination are affected.

Figure 10:
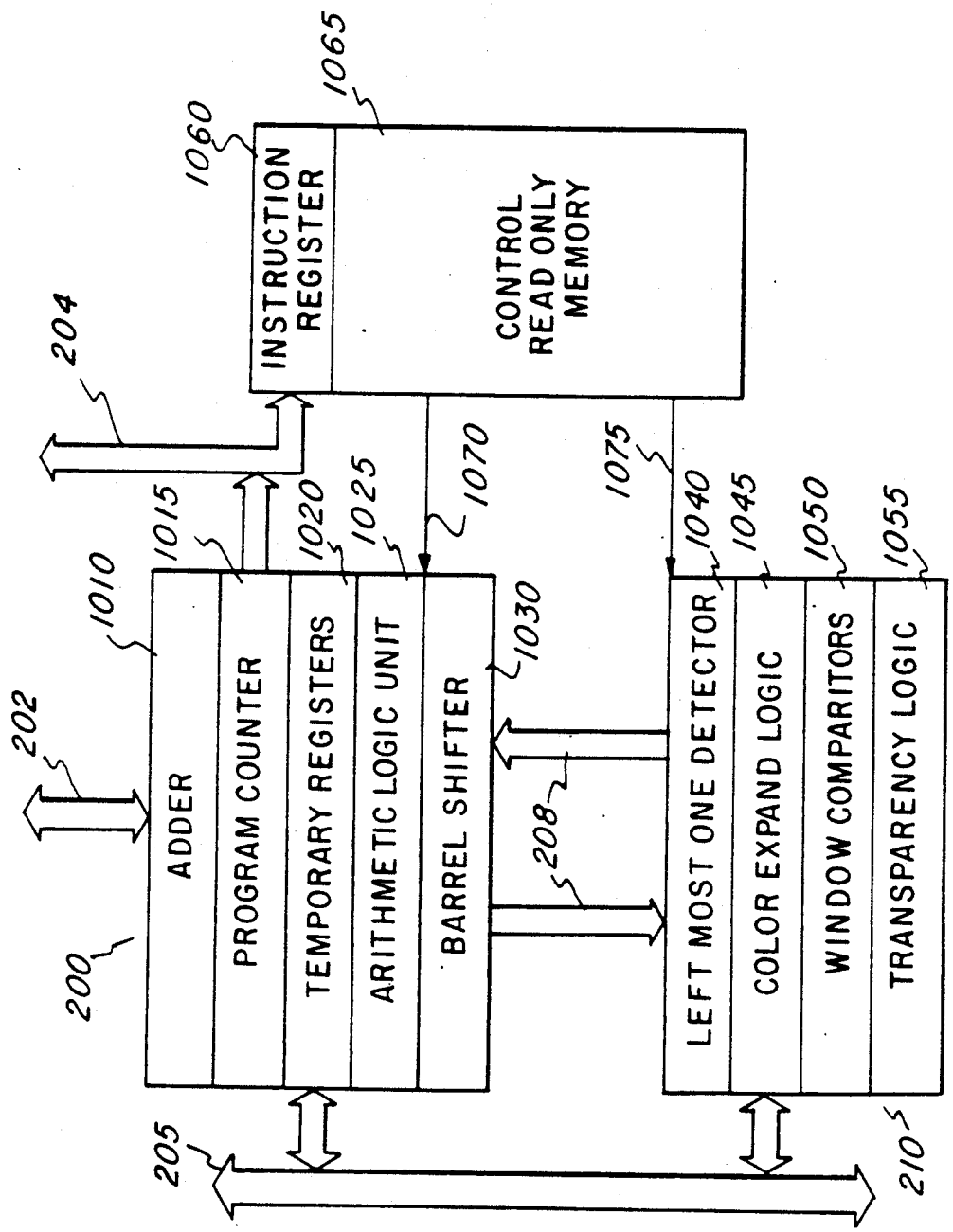
FIG. 10 illustrates further details of the central processing unit and the special graphics hardware of the graphics data processor of the present invention.

FIG. 10 illustrates in somewhat greater detail the structure and interrelationship between central processing unit 200 and special graphics hardware 210. As previously illustrated in FIG. 2, central processing unit 200 and special graphics hardware 210 are bidirectionally coupled via bus 208. Central processing unit 200 and special graphics hardware 210 are bidirectionally coupled to major bus 205. In addition, FIG. 10 illustrates central processing unit 200 connected to bus 202 which is further coupled to the register files 220 and to bus 204 which is further coupled to instruction cache 230.

FIG. 10 illustrates that central processing unit 200 includes adder 1010, program counter 1015, temporary registers 1020, arithmetic logic unit 1025 and barrel shifter 1030. These elements are conventional in character, corresponding to elements employed in central processing units known in the prior art.

FIG. 10 illustrates various subparts of special graphics hardware 210. Special graphics hardware 210 includes left most one detector 1040, color expand logic 1045, window comparators 1050 and transparency logic 1055. These individual portions of special graphics hardware 210 are particularly adapted for manipulation of pixel information within video random access memory 132. The operation of each of these units will be more fully described below.

FIG. 10 also illustrates instruction register 1060 and control read only memory 1065. Instruction register 1060 receives an instruction from instruction cache 230 via bus 204. The particular instruction recalled for storage in instruction register 1060 is specified by the address stored in program counter 1015. Whether this instruction must be recalled from memory 130 via memory interface 250 or is already stored within instruction cache 230, this instruction is stored in the instruction register 1060. The instruction stored in instruction register 1060 activates control read only memory 1065 to output a plurality of control signals corresponding to the particular instruction being executed. Thus control read only memory 1065 performs the function of an instruction decoder. The control signals are applied to central processing unit 200 via control bus 1070 and to special graphics hardware 210 via control bus 1075. It is contemplated that some instructions which may be stored in instruction register 1060 for implementation via control read only memory 1065 may require only some of the resources of central processing unit 200 or special graphics hardware 210. However, no distinction is made in the instruction itself or in the control signals stored within control read only memory 1065. In any case of an instruction being received by graphics processor 120, it is loaded into instruction register 1060 for implementation via control signals on control buses 1070 and 1075 derived from control read only memory 1065. It is contemplated that in some cases cooperation between central processing unit 200 and special graphics hardware 210 will be required in order to implement a single instruction. This is to be expected in the same manner in which several portions of central processing unit 200 would ordinarily be required to implement any instruction directed solely to the resources of central processing unit 200.

FIGS. 11 illustrates the operation of transparency masking in accordance with the preferred embodiment of the present invention. Graphics processor 120 of the present invention contemplates the employment of special transparent pixels whose insertion into video random access memory 132 does not alter the prior contents of this memory. The detection of transparent pixels occurs in transparency logic 1055 of special graphic hardware 210. FIG. 11 illustrates the operation of transparency as employed during a pixel array move operation.

FIG. 11 illustrates 16 bit words which include pixels N, N+1, N+2 and N+3, each pixel having 4 bits. The data to be written into the destination location is illustrated at 1110. This data includes a single transparent pixel 1112. Also included in the source data 1110 is a set of 4 consecutive bits "0" 1114 equal in length to the pixel size crossing a pixel boundary. Transparency logic 1055 detects the transparent pixel 1112 but makes no detection of a transparent pixel for the case of the 4 consecutive bits "0" 1114 which cross a pixel boundary. Transparency logic 1075 thus generates a transparency mask 1120 having all "1's" for the nontransparent pixels and all "0's" for the transparent pixel 1112. Data word 1130 corresponds to the destination data at the location within video random access memory 132. These three data words 1110, 1120 and 1130 are combined within memory interface 250 to generate resultant word 1140 which is written into the desired location within video random access memory 132. Note that resultant word 1140 includes N, N+1 and N+3 which are identical to the source pixel 1110. The pixel N+2 corresponds to the prior destination pixel of word 1130. Thus transparent pixel 1112 within source data word 1110 causes the resultant to be unchanged in that particular pixel.

FIG. 12 illustrates an example of plane masking. FIG. 12 illustrates three data words 1210, 1220 and 1230 each composed of two 8 bit pixels N and N+1. Data word 1210 shows a representation of data read from a particular data word of video random access memory 132. Data word 1220 illustrates an example of a possible plane mask stored in register 950. These plane mask bits may be selected in any desired combination in order to separate differing color values, or control functions of the pixel code. The plane mask shown in 1220 is merely an illustrative example and has no significance otherwise. Plane mask 1220 is applied to mask data bus 1480, along with other masking information as will be described below. Mask data bus 1480 is applied to memory interface 250 which, for purposes of plane masking, combines the data words 1210 and 1220 to generate the resultant data word 1230. Note that in each of the pixels N and N+1, the data is "0" where the plane mask 1220 was "0" and that the data equals the corresponding bit from source data 1210 where the plane mask 1220 was "1".

Figure 13:
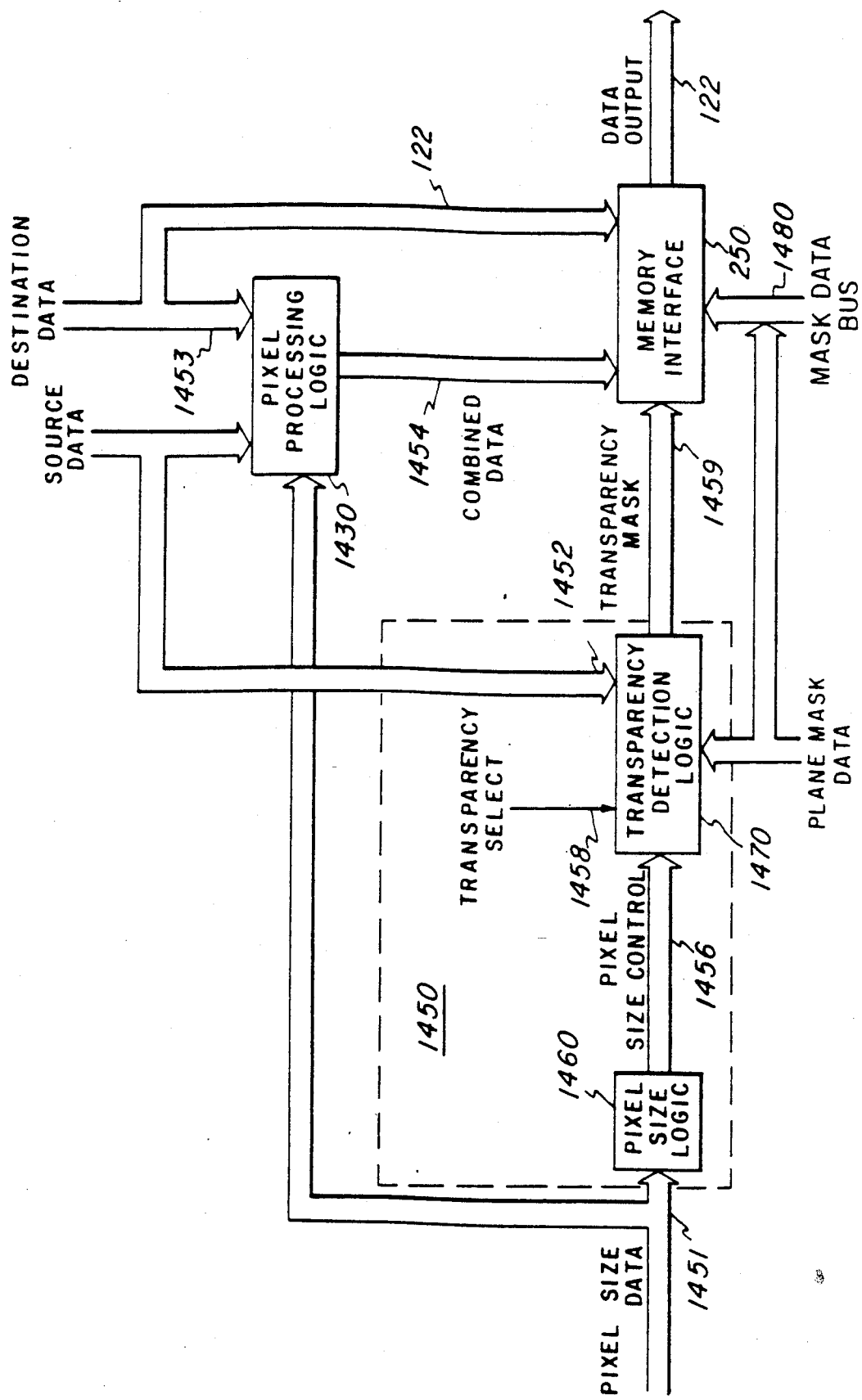
FIG. 13 illustrates details of the hardware employed to implement transparency in accordance with the present invention.

FIG. 13 illustrates the general construction of the transparency apparatus which detects for each pixel whether or not it should be treated as transparent. FIG. 13 illustrates transparency logic 1450 which is a part of special graphics hardware 210. Transparency logic 1450 includes pixel size logic 1460, and transparency detection logic 1470. Plane mask data 1457 is applied not only to mask data bus 1480, but also to transparency logic 1450; combined data bus 1454 from pixel processing logic 1430 is also applied to transparency logic 1450. In general, transparency detection logic 1470 detects transparent pixels from the source data on source data bus 1452 and enables memory interface 250 to select the combined data from pixel processing logic 1430 on combined data bus 1454 for non-transpareny pixels, and to select the destination data from video memory 130 on local memory bus 122 for transparent pixels. Memory interface 250 will accordingly present the selected output on bus 122, to write the output into the destination location in processing block 807 of FIG. 8.

Pixel size logic 1460 receives pixel size data on pixel size bus 1451 and generates pixel size control data on pixel size control bus 1456. The pixel size data corresponds to the data stored in register 940 illustrated in FIG. 9. This data is passed to special graphics hardware 210 from input/output registers 260 and is available for use in the special graphics hardware 210. As noted above in conjunction with FIG. 9, the pixel size data stored in register 940 corresponds to the number of bits per pixel of the color codes representing the pixels of the graphics image. In accordance with the preferred environment of the present invention, the pixel size may be either 1, 2, 4, 8 or 16 bits. As illustrated in FIG. 5, this permits an integral number of pixels to be contained within a single 16 bit data word. As a consequence, the pixel size can be represented by a 5 bit number in which only a single of the 5 bits is a "1".

Transparency detection logic 1470 receives inputs from source data bus 1452, pixel size control bus 1456, plane mask data bus 1457 and transparency select line 1458. Transparency detection logic 1470 generates an output on combined mask bus 1459 which indicates bit by bit whether the combined data or the destination data is to selected by transparency select logic 1440. Transparency detection logic 1470 detects transparent pixels from the source data 1452, that is pixels in which all of the bits are "0". Transparency select signal 1458 comes from transparency enable/disable section 912 of register 910 and controls whether transparency is enabled or disabled. The transparency detection is made in conjunction with the plane mask data on plane mask data bus 1457 such that bits which are not enabled by the plane mask are not employed in the detection of transparency. The plane mask data on bus 1457 comes from register 950 illustrated in FIG. 9.

Referring back to FIG. 13 it is seen that pixel processing logic 1430 is responsive to source data bus 1452, destination data bus 1453 and pixel size data bus 1451. Pixel processing logic 1430 generates an output on combined data bus 1454 for application to memory interface 250, as will be discussed below. Pixel processing logic 1430 forms some sort of arithmetic or logical combination between the individual pixel data from source data bus 1452 and destination bus 1453. The particular source destination combination is selected by the pixel processing section 916 of register 910 illustrated in FIG. 9. This combined data is then applied to memory interface 250, which will select between the destination data on bus 122 and the combined data on bus 1454 on a bit by bit basis dependent upon the corresponding bit of transparency mask bus 1459, and the corresponding bits of other masks, including plane mask data bus 1457, presented on mask data bus 1480.

Figure 14:
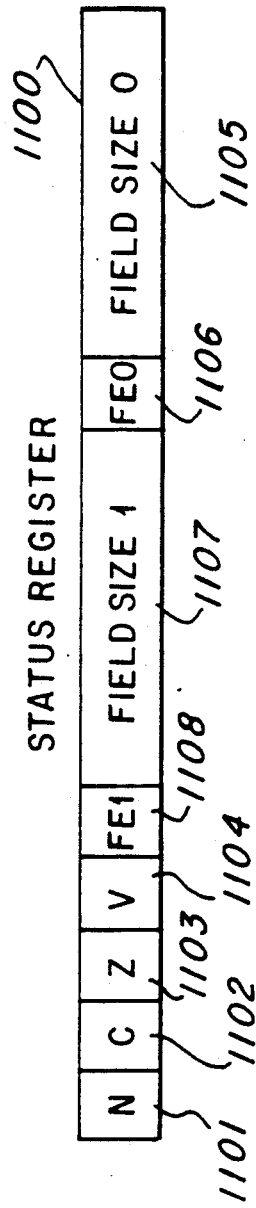
FIG. 14 illustrates the details of the status register in accordance with the preferred embodiment of the present invention.

FIG. 14 illustrates various parts of status register 1100 which are relevant to the addressing of variable size fields within a data word, and the generation of left and right masks for those portions of data words which are not to be written to video memory 130 because they are outside of the field. These parts of status register 1100, which may be set and reset by central processing unit 200, define two sets of separate field size and field extension options. Field size 0 portion 1105 is 5 bits which indicate the length of a field operated upon by central processing unit 200. In accordance with the preferred environment of the present invention central processing unit 200 operates on 32 bits simultaneously. Graphics processor 120 is enabled to operate on field sizes from 1 to 32 bits in accordance with the field size set within field size 0 portion 1105. A similar field size 1 portion 1107 also of 5 bits indicates a second field size. Any instruction of central processing unit 200 capable of operating on variable field sizes will include 1 bit which designates field size 0 portion 1105 or field size 1 portion 1107 of status register 1100 to indicate the length of the field size selected. Field extension 0 bit 1106 and field extension 1 bit 1108 indicate the sign extension options for the respective field sizes. When the field size operated on by central processing unit 200 is less than 32 bits the remaining bits of the word applied to central processing unit 200 must be filled in some manner. When the respective field extension 0 bit 1106 or field extension 1 bit 1108 is "0", then the remaining portion of the 32 bit word applied to central processing unit 200 are filled with 0's. On the other hand if this bit is "1", the numbers operated on by central processing unit 200 are sign extended. In this regard, if the number is positive then these additional field extension bit are set to "0". If, on the other hand the number is negative, these additional field extension bits are set to "1". This corresponds to the use of a two's complement arithmatic to represent negative numbers. The operation of the selected field size and field extension will be further described below in conjunction with the figures.

Figure 15:
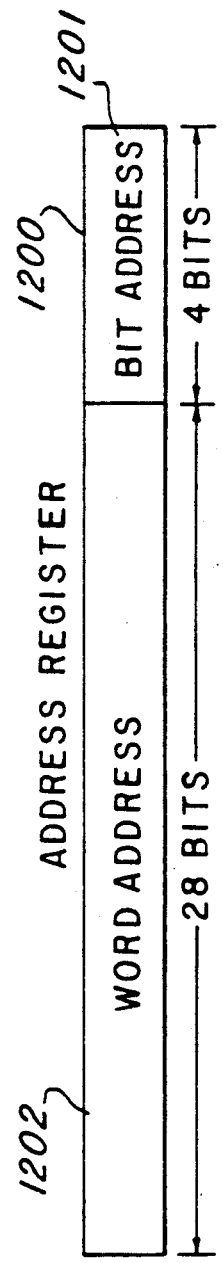
FIG. 15 illustrates the details of the address register in accordance with the preferred embodiment of the present invention.

FIG. 15 illustrates address register 1200. In the preferred embodiment address register 1200 is 32 bits long, the same as the length of the data words employed by central processing unit 200. In accordance with the preferred embodiment regarding the selection of variable field sizes, the address register 1200 specifies a particular bit within memory 130, rather than the more normal word specification. Thus address register 1200 includes a bit address portion 1201 of 4 bits and a word address portion 1202 of 28 bits. Word address 1202 specifies an individual 16 bit word within memory 130 in accordance with the preferred embodiment. The bit address 1201 specifies a particular bit within that selected word. The address provided to memory 130 from graphics processor 120 includes only the word address 1202. The bit address 1201 is employed internally within graphics processor 120 to make the selection of the desired bits.

FIG. 16 illustrates hardware within memory interface 250 and other portions of graphics processor 120 which together enable the access to memory 130 in accordance with a set of priorities and further permit access to memory 130 via central processing unit 200 in a specified field size. FIG. 16 illustrates a plurality of registers, 902, 904, 906/907, and 905 which are a part of input/output registers 260. FIG. 16 further illustrates central processing unit address register 1200, and plane mask register 950. Each of these registers is connected to memory interface 250 for connection to bus 122. Also connected to memory interface 250 is transparency mask 1459, and a data latch including central processing unit most significant bits data latch 1440 and central processing unit least significant bits data latch 1445.

Control of the operation of memory interface 250 is via sequencer 1400. Sequencer 1400 receives various input control and data signals. The control signals include display refresh request appearing at input 1401, DRAM refresh request appearing at line 1402, host access request appearing at line 1403, host read/write control appearing at line 1404, central processing unit access request at line 1405 and central processing unit read/write control at line 1406.

Sequencer 1400 receives data signals from several sources. Firstly, the bit address 1201 from central processing unit address register 1200 is applied to zero detector 1420. The bits of the bit address 1201 are applied to sequencer 1400 via lines 1407. A zero detection signal from zero detector 1420 is applied to sequencer 1400 via line 1408. The bit address from bit address register 1201 is also applied to an adder 1418. Adder 1418 also receives the field size from bus 1417. As noted above, the field size comes from the status register 1100. Either field size 1105 or field size 1107 is selected by the particular instruction being executed by the central processing unit 200. In accordance with this selection the 5 bit field size is applied to adder 1418 via bus 1417. The output of adder 1418 is a 6 bit quantity which is stored within latch 1419. The 4 least significant bits (labeled bits 0 to 3) are applied to zero detector 1421. These 4 least significant bits are applied to sequencer 1400 via bus 1411. A zero indication signal is applied to sequencer 1400 via line 1412. The 2 most significant bits of latch 1419 (here designated as bits 5 and 4) are applied sequencer via lines 1409 and 1410, respectively. Sequencer 1400 generates outputs 1413, 1414, 1415 and 1416. The structures these outputs control will be discussed below.

Multiplexer 1430 controls the particular data applied to the memory bus 122 as directed by output 1416 from sequencer 1400. Multiplexer 1430 is coupled to register 902 receiving the display refresh address on bus 1431. Multiplexer 1430 is connected to video RAM refresh address register 904 via bus 1432. Multiplexer 1430 likewise receives the combined host address from registers 906 and 907 on bus 1433. Register 905 containing the host data is bidirectionally coupled to multiplexer 1430 via bus 1434. The word address portion 1202 of the central processing unit address register 1200 is applied to multiplexer 1430 via bus 1435. Bus 1436 bidirectionally couples multiplexer 1430 to input output latch 1439 and hence via bus 205 to central processing unit 200.

Mask data bus 1480 receives the contents of plane mask register 950 (via bus 1457) and the contents of right mask 1437 and left mask 1438. Right mask 1437 is controlled from sequencer 1400 via line 1413, and serves to mask, for a memory write access, the least significant bit portions of data applied by bus 205 to input output latch 1439. Likewise, left mask 1438 is controlled by sequencer 1400 via lines 1414, and serves to mask the most significant bits of the data on bus 205. While left mask 1438 and right mask 1437 are shown as generated internal to memory interface 250, such mask data, as well as mask data for different masking functions, can be generated external to memory interface 250 and applied to mask data bus 1480 similarly as the plane mask data from register 950, as suggested in FIG. 13.

Central processing unit 200 includes most significant bits data latch 1440 and least significant bits data latch 1445. These latches are bidirectionally connected to input/output latch 1439 via bus 205. Line 1415 from sequencer 1400 determines whether the data transfer occurs from the most significant bits 1440 or the least significant bits 1445. CPU 200 also includes barrel shifter 1450 which is bidirectionally coupled to the two data latches 1440 and 1445. Barrel shifter 1450 serves to shift the data received from the combined central processing unit most significant bits data latch 1440 and central processing unit least significant bits data latch 1445 in the manner specified by central processing unit 200. Barrel shifter 1450 is controlled by field sign/zero extend control 1451. As noted in conjunction with FIG. 14, a field extend 0 bit 1106 or a field extend 1 bit 1108 specifies whether the field is sign extended or zero extended. One of these two bits of the status register 1100 is selected by the particular instruction being executed. This control is applied to barrel shifter 1450. Barrel shifter 1450 is coupled to other portions of central processing unit 200 via bus 1455.

The general operation of the memory controller 250 will now be described in conjunction with FIG. 16. Depending upon the particular control and data signals received by sequencer 1400, sequencer 1400 selects one source applied to multiplexer 1430 for application to the memory 130 via bus 122. Thus, for example, sequencer 1400 may cause multiplexer 1400 to couple the display refresh address stored in register 902 to the memory in response to a display refresh request on line 1401. Similarly, a DRAM refresh request on line 1402 causes sequencer 1400 to control multiplexer 1430 to apply the video RAM refresh address stored in register 904 to memory 132. A host access request appearing on line 1403 together with the host read/write control appearing on line 1404 enables sequencer 1400 to control multiplexer 1430 to apply the host address stored in the combined register 906 and 907 to memory 130 via bus 122 and further to exchange data between the memory and register 905 in accordance with the selected operation. Lastly, a central processing unit access request on line 1405 together with the central processing unit read/write control appearing on line 1406 enables sequencer 1400 to couple the central processing unit word address stored in subpart 1202 of central processing unit address register 1200 to memory 130 via multiplexer 1430. Then, in accordance with the read or write operation selected by central processing unit read/write control appearing at input 1406, data is exchanged between memory 130 and the central processing unit via bus 1436. In the case of a write operation, this data is to be masked by the right mask 1437 and left mask 1438 responsive to control signals from sequencer 1400 via control lines 1413 and 1414, respectively. The contents of right mask 1437 and left mask 1438, as well as plane mask 1457, are applied to mask data bus 1480 by signal ME from sequencer 1400. Transparency mask 1459 will also be applied by memory interface 250 to the data from bus 205 in the case of write operations. This data is then exchanged with data from the central processing unit least significant bits data latch 1445 and central processing unit most significant bits data latch 1440 in a manner which will be more fully disclosed below.

Figure 17:
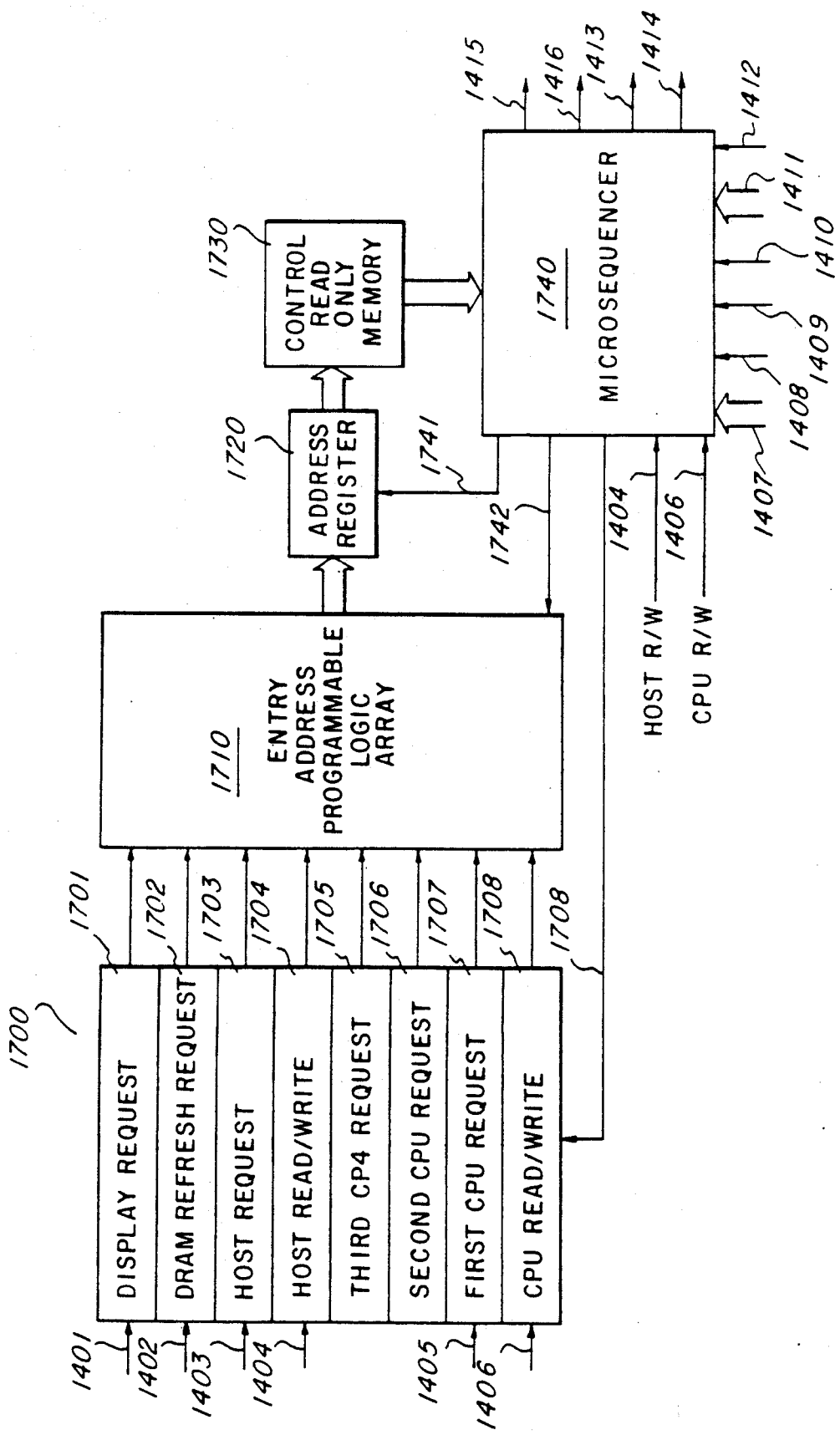
FIG. 17 illustrates the details of the sequencer illustrated in FIG. 16.

FIG. 17 is a more detailed block diagram of sequencer 1400. Sequencer 1400 includes a set of latches 1700, entry address programmable logic array 1710, address register 1720, control read only memory 1730 and microsequencer 1740. The various request signals are applied to individual latches within the set of latches 1700. The signals at these latches are applied to entry address programmable logic array 1710 which generates an entry address for application to control read only memory 1730. This derived entry address is stored in address register 1720. Once this entry address is generated, control read only memory 1730 controls the operation of microsequencer 1740 for generation of the various output signals of sequencer 1400.

Latches 1700 includes a set of latches for storing various request and control signals applied to sequencer 1400. Latches 1700 include display request latch 1701, which receives the display refresh signal. DRAM refresh request latch 1702 receives the DRAM refresh request signal on line 1400. Host request latch 1703 receives the host request signal on line 1403. Host read/write control latch 1704 receives the host read/write control signal on line 1404. Third central processing unit request latch 1705 is set by microsequencer 1740 via control lines 1743 in a manner which will be more fully described below. Likewise, second central processing unit request latch 1706 is set by microsequencer 1740. First central processing unit request latch 1707 receives the central processing unit request signal on line 1405. Lastly, central processing unit read/write control latch 1708 receives the central read/write control signal on line 1406.

Entry address programmable logic array 1710 receives a signal from each of the latches 1700. In addition, entry address programmable logic array 1710 receives a control signal 1742 from microsequencer 1740. This control signal chiefly indicates whether or not microsequencer 1740 is engaged in servicing a current memory access request. In accordance with the signals applied to entry address programmable logic array 1710, an address specifying an entry point within control read only memory 1730 is generated. This address is applied to address register 1720 where it is stored.

Address register 1720, control read only memory 1730 and microsequencer 1740 constitute a programmable controller. The entry points selected by entry point programmable logic array 1710 within control read only memory 1730 are the beginnings of subroutines for servicing the corresponding memory access request. The instructions of these subroutines stored within control read only memory 1730 are applied sequentially to microsequencer 1740 which performs various output operations in accordance with this instruction on lines 1413, 1414, 1415 and 1416, as well as a plurality of lines (indicated as I/O on FIG. 17, and including signals PC—, TRI, INT, LD, EXT, WL, and ME) which will be discussed below relative to the masking feature of input/output latch 1439 illustrated in FIG. 20. In this regard an increment signal is applied to address register 1720 via line 1741 from microsequencer 1740, each time an ordinary instruction has been executed in order to enable the recall of the next sequential instruction. In addition to the outputs named above, microsequencer 1740 generates control outputs on lines 1743 to latches 1700. This control output is concerned with the setting and resetting of various latches within latches 1700. Lastly, microsequencer 1740 also receives the host read write control signal on line 1404 and the central processing unit read write control signal on line 1406. The general outline of an example of a particular control subroutine which utilizes the left and right mask feature, and which is stored within control read only memory 1730 will be more fully described below in conjunction with FIG. 18.

Figure 18:
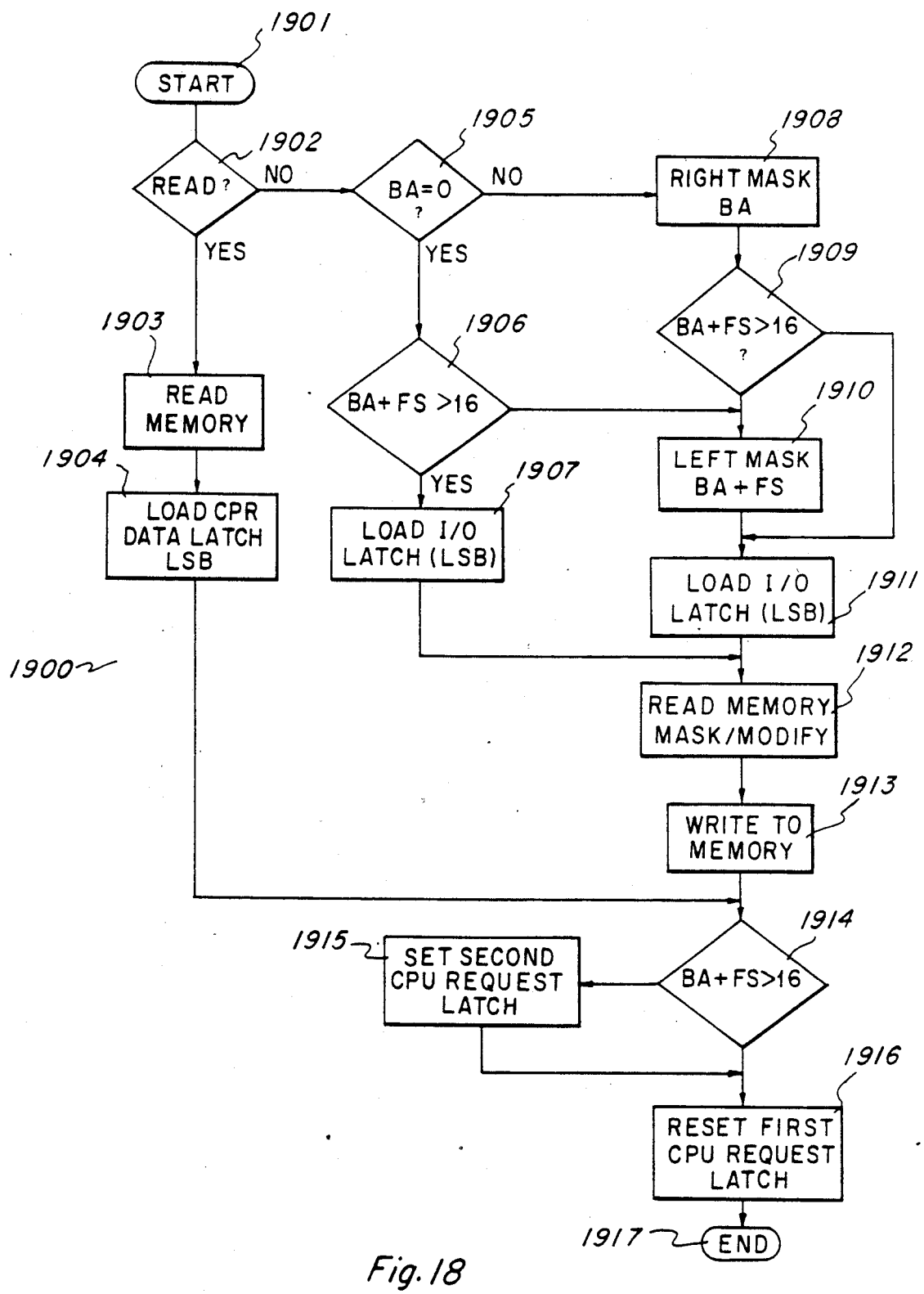
FIG. 18 is a flow chart illustrating the operation of the sequencer when performing a memory access in accordance with the preferred embodiment of the invention.

FIG. 18 illustrates program 1900 which services a first central processing unit access request. This program 1900 is one of a set of memory access servicing subroutines stored in control read only memory 1730. Upon entry of this program (start block 1901) the program initially tests to determine whether the access request is a read access (decision block 1902). This determination is made based upon the state of the central processing unit read/write signal applied to sequencer 1400 via line 1406. If the memory access request calls for reading the memory, then the memory is read (processing block 1903). This is accomplished by applying the address stored in central processing unit address register 1202 to memory 130 via multiplexer 1430 together with a memory read signal. The data word stored at this memory location is then loaded into the input/output latch 1439. Right mask 1437, left mask 1438, transparency mask 1459 and plane mask 1457 will have no effect upon this data transfer; since no data is being written to video memory 130, no masking is necessary. This data is then loaded into the central processing unit least significant bits data latch 1445 (processing block 1904). Any data in the memory not within the desired data field is removed in barrel shifter 1450. The program next goes to decision block 1914 to test whether a second central processing unit access request is necessary, in order to obtain the rest of the desired data word.

In the event that the central processing unit access request is a write request, and thus not a read request, program 1900 tests to determine whether the bit address is zero (decision block 1905). This test is made simple by zero detect circuit 1420 which receives the bit address and generates a signal on line 1408 indicating whether or not the bit address is zero. If the bit address is zero then the desired data field starts on a memory word boundary, and no bits need be masked by right mask 1437. If the bit address is zero, then program 1900 tests to determine whether the sum of the bit address and the field size is greater than or equal to 16 (decision block 1906). The sum of the bit address and the field size formed by adder 1418 are applied to sequencer 1400 via lines 1409 and 1410, and bus 1411. In addition zero detect circuit 1421 provide an indication of whether or not the four least significant bits of this sum (bits 0 to 3) is zero. This sum is greater than 16 if bit 5 on line 1409 is a "1" or bit 4 on line 1410 is a "1" and bits 0 to 3 are nonzero as indicated by line 1412. If the sum is greater than 16, then the first central processing unit access request is a simple write operation, and no bits need be masked by left mask 1438.

The input/output latch is loaded from the central processing unit least significant bits data latch 1445 (processing block 1907), in preparation for the memory access cycle, which is a read-modify-write operation for those write accesses within which masking is desired. As is well known in the art, a memory access of the read-modify-write type consists of a read of the contents of the addressed memory location, followed by a write of the same memory location, without readdressing of the memory; the read and write portions of the read-modify-write memory access are indicated by processing blocks 1912 and 1913. For each bit that is not masked by the corresponding sixteen-bit portion of either transparency mask 1459 or plane mask 1457, memory interface 250 will write the data in the input/output latch into the memory indicated by the central processing unit word address stored in register 1202 during the write portion of the read-modify-write memory access (processing block 1913). For those bits which are masked by either transparency mask 1459 or plane mask 1457, the contents of input/output latch 1439 will be overwritten by the contents of the address memory location of register 1202 during the read portion of the read-modify-write memory access (processing block 1912). Accordingly, during the write portion of the read-modify-write access (processing block 1913), the same contents of the addressed memory location will be rewritten back for the bits which have been masked. Program 1900 then tests to determine whether a second central processing unit access is required (decision block 1914) for the other sixteen bits of the thirty-two bit data word.

It should be noted that if no masking is required, a "simple" write may be effected by which the memory access cycle is merely a write cycle, and not a read-modify-write cycle. As will be discussed in greater detail below, the read-modify-write cycle is useful for graphics controller 120, in order for the masking feature of the invention to be operable.

If the bit address is not zero, then program 1900 sets the right mask 1427 corresponding to the bit address, so that all bits less significant than the addressed bit are masked. The bit address is applied to sequencer 1400 via bus 1407. If the bit address was nonzero or if the bit address was zero and the sum of the bit address and the field size are neither 16 or 32, program 1900 tests to determine whether the sum of the bit address and the field size are greater than 16 (decision block 1909). If this sum is less than 16, whether the bit address is zero or nonzero, then a left mask is set according to this sum (processing block 1910), masking those bits more significant than the upper boundary of the addressed field. If the sum of the bit address and the field size is greater than 16, no left mask is needed because the field extends up to or beyond the memory word boundary. In either event the input/output latch 1439 is loaded from the central processing unit least significant bits data latch 1445 (processing block 1911).

As described above in the case of the write within the data word, a read-modify-write cycle is performed on the video memory location corresponding to the address stored in register 1202, and the contents of input/output latch 1439 is loaded from data latch 1440/1445. For those bits which are not masked by right mask 1437, left mask 1438, transparency mask 1459 or plane mask 1457, then the data within input/output latch 1439 are written to the addressed location of video memory 130 during the write portion of the memory access. For those bits which are masked by either transparency mask 1459 or plane mask 1457, the contents of input/output latch 1439 will be overwritten by the contents of the address memory location of register 1202 during the read portion of the read-modify-write memory access. Accordingly, during the write portion of the read-modify-write access, the same contents of the addressed memory location will be rewritten back for the bits which have been masked (processing blocks 1912 and 1913). This process insures that those portions of the memory word not within the selected data field are unchanged while those portions of the memory word within the selected data field are replaced by the previously loaded data from the central processing unit data latch.

Program 1900 is ended by testing whether or not a second central processing unit access is needed. This is determined by checking whether or not the sum of the bit address and the field size are greater than 16 (decision block 1914). If this sum is greater than 16, then a second access is needed. This is indicated by setting the second central processing unit access request latch 1706 (processing block 1915). This is signaled to request latches 1700 from microsequencer 1740 via line 1743. In any event, the first central processing unit request latch is reset (processing block 1916) indicating the request has been serviced. Program 1900 is then exited (end block 1917).

In the event that servicing of a second central processing unit access request is required, a program substantially the same as program 1900 is executed. This program of course is different from program 1900 is such a way that to comprehend that the sixteen most significant bits of the data word are to be operated upon. For example, the central processing unit word address stored in register 1202 must be incremented in order to refer to the correct memory data word in the second central processing unit access. Because the address stored in central processing unit address register 1200 includes the bit address 1201, the number 16 must be added to the address register 1200 to refer to the next memory word.

Upon entry, this program again initially tests to determine whether the access request is a read access, based upon the state of the central processing unit read/write signal applied to sequencer 1400 via line 1406. If the memory access request calls for reading the memory, then the memory is read in the same manner as noted above in conjunction with processing block 1903, except that the data thus recalled from memory 130 is then loaded into the central processing unit most significant bits data latch 1440, subject to operation by barrel shifter 1450. The program next tests whether a third central processing unit access request is necessary.

In the event that the second central processing unit access request is a write request and not a read request, the program must determine whether the sum of the bit address and the field size is greater than or equal to 32 (rather than 16 as in program 1900). If bit 5 of the sum on line 1409 is "1" then the sum is 32 or more. If this sum is greater than or equal to 32, then the write operation extends beyond the second word boundary. If this is the case then the second central processing unit access is a simple write operation. Thus the input/output latch is loaded from the central processing unit most significant bits data latch 1440 and the data in the input/output latch is written into the memory, subject to masking from the most significant portion of transparency mask 1459 and plane mask 1457. As in the case of the read operation, the program next goes to decision block 2011 to test whether a third central processing unit access request is necessary.

If the sum of the bit address and the field size is less than 32, then a left mask is set in accordance with the sum of the bit address and the field size, as discussed above in program 1900. The input/output latch is loaded with the data from the central processing unit most significant bits data latch 1440, masking from the most significant bits from transparency mask 1459, left mask 1438 and plane mask 1457 occurs as before, and data is written to memory as described above relative to processing blocks 1912 and 1913 illustrated in FIG. 18. Note that no right mask is required because any second central processing unit access would necessarily include the least significant bits of the memory word.

This program is ended by testing whether or not a third central processing unit access is needed. This is determined by checking whether or not the sum of the bit address and the field size is greater than 32. If this sum is greater than 32, then a third access is needed. This is signaled by setting the third central processing unit access request latch 1705. This is signaled to request latches 1700 from microsequencer 1740 via line 1743. A new thirty-two bit data word must be recalled, and the program repeated; the field size of course must be reduced by the value 32, to comprehend that the operation on the first thirty-two bits of the field has already occurred.

Figure 19:
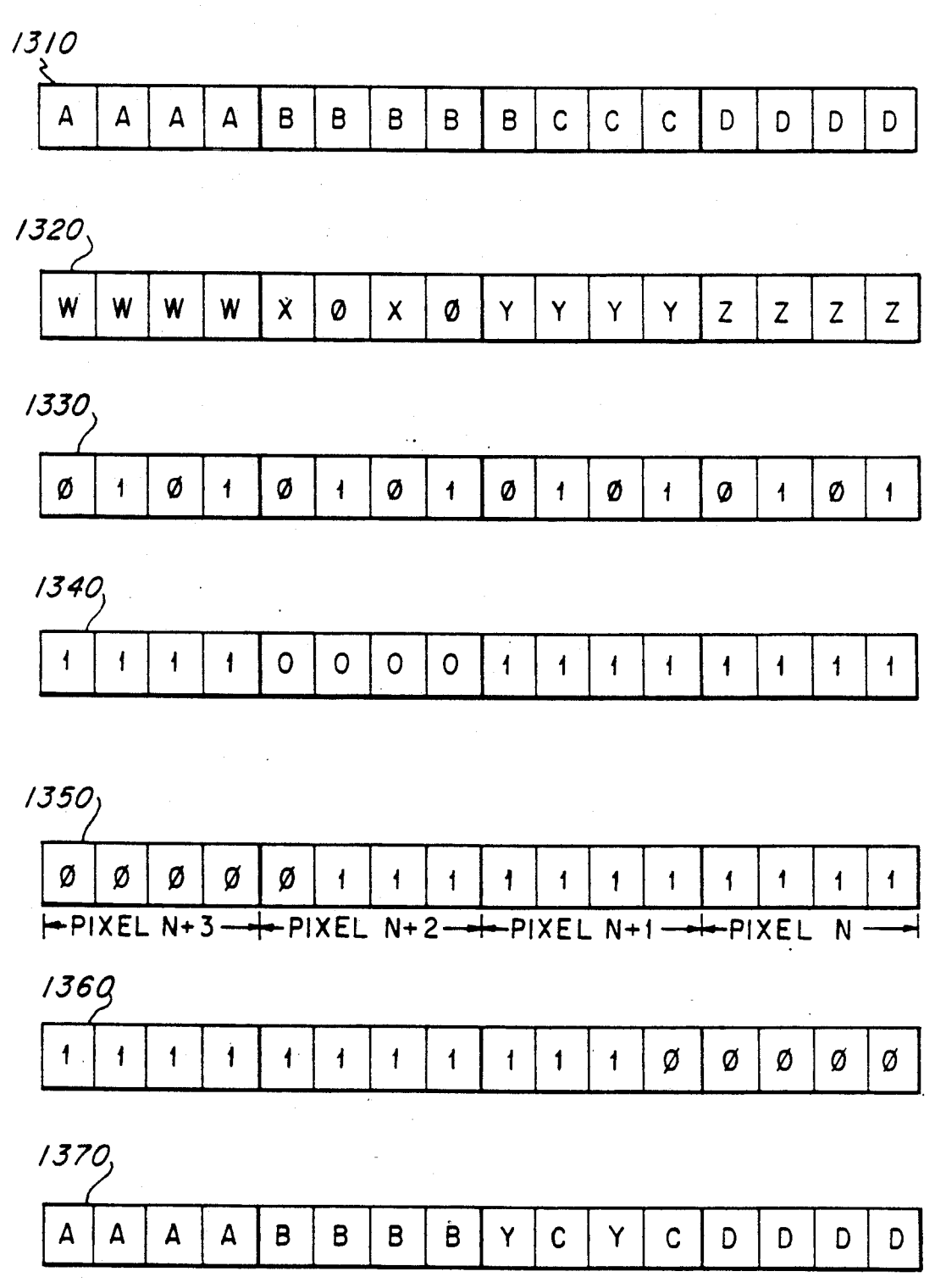

FIG. 19 illustrates an example in which transparency, left, right, and plane masking are employed in combination. FIG. 19 illustrates a 16 bit data word divided into four 4-bit pixels N through N+3. Data word 1310 illustrates four pixels of the original data at the destination location which are to be altered. Data word 1320 illustrates four pixels of the source data which is to be moved to those bits of the destination location which are not masked, replacing the original contents of data word 1310 at those bits. Note that the first and third least significant bits of pixel N+2 of source data 1320 are "0's". Data word 1330 illustrates the plane mask selected for this example. This plane mask is recalled from register 950. In this particular example the plane mask illustrated in 1330 disables the second and fourth least significant bits, and conversely enables the first and third least significant bits, for each pixel. Note that the second and fourth least significant bits of each pixel N through N+3 are "0's" in accordance with plane mask 1330.

The combination of the source data from 1320 and the plane mask from 1330 is used in determining the transparency of each pixel by transparency detection logic 1470 of FIG. 19; by way of review, if all bits of a pixel after combination of the plane mask with the source data are zero (or the selected transparency state), the pixel is considered "transparent" to the operation on the video memory 130. For the example of FIG. 19, the operation is considered a logical AND between the source data word 1320 and plane mask 1330. In the example of FIG. 19, pixel N will not be transparent, since the values of the bits of the source data which are not masked by the plane mask 1330 are non-zero. Referring to pixel N+2 of FIG. 19, however, the second and fourth least significant bits of pixel N+2 are zero from plane mask 1330, while source data word 1320 for pixel N+2 has two zeroes in the first and third least significant bits. Therefore, after application (i.e., a logical "AND" operation) of plane mask 1330 to source data 1320, pixel N+2 will be considered transparent. Data word 1340 corresponds to the transparency mask generated by transparency logic 1055. Note that pixel N+2 of data word 1340 includes all zeros, which is the transparent code in the preferred embodiment. On the other hand, since the logical AND of the source data word 1320 with plane mask 1330 does not result in all bits of pixel N being "0", pixel N of transparency mask 1340 is all "1's".

In the example of FIG. 19, the field size is six bits, while the bit address is five. This causes the right mask (data word 1360) to have its first five bits (bits 0 through 4) set to the zero, or disable, state. Left mask (data word 1350) has bits 11 through 15 disabled, as 11 is the sum of the bit address (5) and the field size (6).

Data word 1370 shows the resultant data word, after application of all four mask operations. Pixel N continues to have the same data as originally stored therein (see data word 1310), since its bits fall within the disabling portions of right mask (data word 1360). Pixel N+2 has the same data as that stored in data word 1310, because of the transparency mask 1340, resulting from the logical AND of the source data word 1320 and plane mask 1330 resulting in all zeroes. Pixel N+3 also remains the same as originally stored in data word 1310, since all bits of data word were masked by left mask (data word 1350). The only pixel that has source data word 1320 applied in part is pixel N+1. The least significant bit of pixel N+1 remains the same as original data word 1310, because of the effect of right mask (data word 1360) and also because of plane mask 1330. The third least significant bit of pixel N+1 also remains the same as original data word 1310, because of plane mask 1330. The second and fourth least significant bits of pixel N+1 show that the source data word 1320 has its values applied, however, as none of the masks were operable to mask the application of the data write for these bits. Memory interface 250 will accordingly write this data back into video memory 130, at the location which stored original data word 1310.

Figure 20:
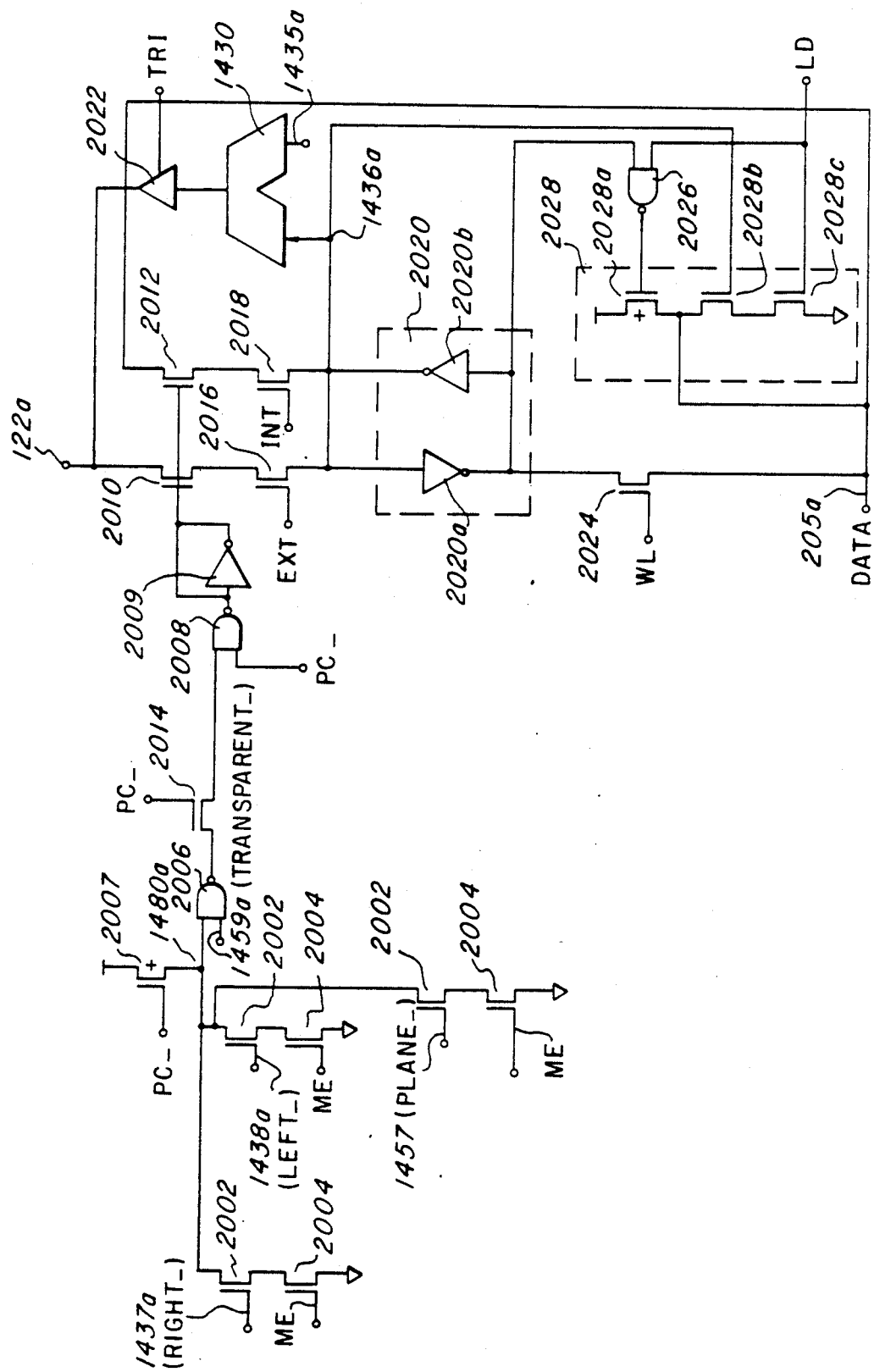
FIG. 20 illustrates, in schematic form, the structure of the input/output latch for one bit of the memory interface.

FIG. 20 is a schematic diagram of one bit of input/output latch 1439, and its interconnection to the mask inputs. Each of the bits of right mask bus 1437, left bus 1438 and plane mask 1457 are connected to the gate of an n-channel transistor 2002; it should be noted that mask bits 1437a, 1438a, and 1457a are all negative logic (the mask condition is indicated by a low state on mask bits 1437a, 1438a and 1457a). Mask evaluate signal ME is another control output from sequencer 1400, and allows evaluation of the mask condition when in its positive logic state; mask evaluate signal is presented to the gates of n-channel transistors 2004, and has its source-to-drain path connected in series with that of transistors 2002. The series source-to-drain paths through transistors 2002 and 2004 are connected between one input of NAND gate 2006 and ground. Of course, the logical AND function performed by transistors 2002 and 2004 can be replaced by any logic function which provides the desired control of mask data bus bit 1480a. The wired-OR of the mask bits 1437a, 1438a and 1457a, at the drain of precharge transistor 2007, constitutes mask data bus bit 1480a, in mask data bus 1480 of FIG. 16. Precharge p-channel transistor 2007 has its source-to-drain path connected between mask data bus bit 1480a and $V_{cc}$, and has its gate connected to precharge signal PC_, which is another output of sequencer 1400. The other input of NAND gate 2006 is connected to the bit of transparency bus 1459 which is associated with the bit of input/output latch 1439 shown in FIG. 20. Bit 1459a is also shown in negative logic, in this embodiment.

The output of NAND gate 2006 is connected to one input of NAND gate 2008, and is also connected to the gates of n-channel transistors 2010 and 2012, through pass transistor 2014. The gate of pass transistor 2014, and the other input of NAND gate 2008 are both connected to precharge signal PC__. The output of NAND gate 2008 is connected to the gates of transistors 2010 and 2012, through inverter 2009. The combination of NAND gate 2008 and inverter 2009, connected as shown, serves to convert the logic levels of the output of NAND gate 2006 to logic levels optimized for transistors 2010 and 2012, and also serves as a latch for the output of NAND gate 2006 after precharge signal PC__ returns to a low level. The source-to-drain path of transistor 2010 is connected between bit 122a of memory bus 122, and a pass transistor 2016, which has its gate connected to signal EXT of sequencer 1400. On the other side of pass transistor is a latch 2020 comprised of inverters 2020a and 2020b. Similarly, the bit 205a of data bus 205 is connected to latch 2020, through the series source-to-drain paths of transistors 2012 and 2018. Pass transistor has its gate controlled by signal INT from sequencer 1400. The side of latch 2020 connected to transistors 2016 and 2018 (i.e., the "true" side) constitutes a bit 1436a of bus 1436 which, as discussed above, is connected to an input of multiplexer 1430. The output of multiplexer 1430 is connected to the input of non-inverting drive buffer 2022, which has a tristate input connected to signal TRI from sequencer 1400. Drive buffer 2022 is a relatively large buffer as is well known in the art, and drives bit 122a of memory bus 122. As shown in FIG. 16, bus 1436 is but one of a plurality of inputs to multiplexer 1430; an example of one of these other inputs is bus bit 1435a communicating a bit of address register 1200, shown in FIG. 20. Sequencer 1400 will of course control multiplexer 1430 via output 1416 so that the contents of address register 1200 is driven by driver 2022 to memory 130 during the appropriate time, and so that the contents of bus 1436 (bit 1436a in FIG. 20) are driven by driver 2022 at the appropriate time. It is to be understood, of course, that the input to drive buffer 2022 may alternatively be connected directly to the true side of latch 2020, if no such multiplexing is desired.

The side of latch 2020 opposite from transistors 2016 and 2018 (i.e., the "false" side) is connected through pass transistor 2024 to bit 205a of data bus 205; the gate of transistor 2024 is connected to signal WL from sequencer 1400. The false side of latch 2020 is also connected to one input of NAND gate 2026. The other input of NAND gate 2026 is connected to signal LD from sequencer 1400. Driver 2028 is comprised of p-channel transistor 2028a, and n-channel transistors 2028b and 2028c, all of which have their source-to-drain paths connected in series between $V_{cc}$ and ground. The gate of transistor 2028b is connected to the true side of latch 2020, and the gate of transistor 2028c is connected to signal LD. The output of driver 2028, at the junction of the source-to-drain paths of transistors 2028a and 2028b, is connected to bit 205a of bus 205. Signal LD serves as a tristate signal for driver 2028 as, in its low logic level, both transistors 2028a and 2028c will be non-conductive. Responsive to signal LD being in its high state, the false side of latch 2020 (inverted by NAND gate 2026) will control p-channel transistor 2028a, and the true side of latch 2020 will control transistor 2028b.

Figure 21A:
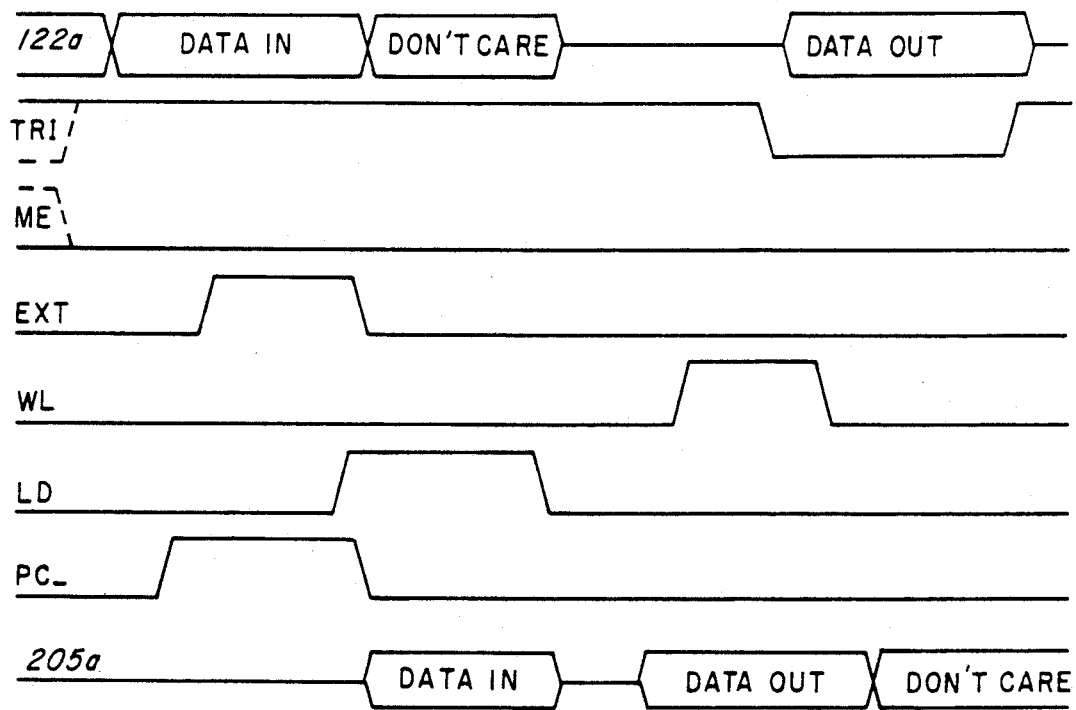
FIGS. 21a and 21b are timing diagrams illustrating the operation of the input/output latch of FIG. 20.

With reference to FIG. 21a, the operation of the bit of input/output latch 1439 illustrated in FIG. 20 will be described for a read memory access, followed by a write memory access in which masking is not enabled. At the beginning of the illustrated read access cycle, signal TRI is in its high state, disabling the operation of drive buffer 2022. It should be noted that prior to the time period shown, however, signal TRI was in its low inactive state during such time as multiplexer 1430 was connecting bus 1435, i.e., the contents of address register 1200, to bus 122. The addressing of memory 130 occurs sufficiently prior to the time period shown in FIG. 20, to allow the necessary access time of memory 130 in providing the output shown as DATA$_{IN}$. Also at the beginning of the read access cycle (and during the addressing portion of the cycle), signals ME, EXT, WL, LD, and PC__ are all in their low state. Accordingly, mask data bus bit 1480a, at the input to NAND gate 2006, is in its precharged high state; transparency select signal 1458 of FIG. 13 is such that the bit 1459a is in its high (no mask) state as well, causing the output of NAND gate 2006 to be preset to a low logic level. Also, since precharge signal PC__ is in its low state, transistor 2014 is isolating the output of NAND gate 2006 from the input of NAND gate 2008, and the other input of NAND gate 2008 is at a low state, causing the output of NAND gate 2008 to be high, and applying a low signal to the gates of transistors 2010 and 2012, isolating bit 122a from the remainder of the circuit.

Bit 122a of bus 122 is further isolated from input/output latch 1439 due to signal EXT being low, turning off transistor 2016. At this time, signal INT is also low, turning off transistor 2018, and will remain low for purposes of the discussion relative to the read and write memory access described herein. Since signal LD is in its low logic state, the output of driver 2028 is in a high impedance state at the beginning of a read memory access. The word of data DATA$_{IN}$ now appears on bus 122 as a result of the addressing (not shown) of memory 130. After such time as DATA$_{IN}$ is expected on bus 122, precharge signal PC__ goes to its high logic level, followed by signal EXT going to its high logic level. The delay between precharge signal PC__ and signal EXT allows the mask data on lines 1437a, 1438a and 1457a to be evaluated prior to the connection of bus bit 122a to latch 2020. However, since signal ME is in its low state, mask data bus bit 1480a is in its high state at the time the output of NAND gate 2006 is connected to the gate of transistor 2010 by pass transistor 2014. Accordingly, transistor 2010 (and 2012) is turned on by the latch and level shifter comprised of NAND gate 2008 and inverter 2009, with the high logic state latched by NAND gate 2008 and inverter 2009.

The data on bit 122a of memory bus 122 (DATA$_{IN}$) now appears at the true side of latch 2020, and is latched thereupon. Since signal WL is in its low state, the false side of latch 2020 is not connected to bit 205a of data bus 205. Driver 2028 can now receive signal LD in its high state, so that the associated bit of DATA$_{IN}$ can be loaded onto bit 205a of data bus 205. As signal LD goes to its high state, the state of the false side of latch 2020 will appear at the gate of transistor 2028a after inversion by NAND gate 2026, and transistor 2028c will be conductive. Either one or the other of transistors 2028a and 2028b will be driven conductive, depending upon the state of the bit of DATA$_{IN}$ on bit 122a of bus 122. If transistor 2028a is conductive (DATA$_{IN}$ in its low state), a high logic state will appear on bit 205a of bus 205; conversely, if transistor 2028b is conductive (DATA$_{IN}$ in its high state), a low logic state will appear on bit 205a. It is therefore apparent that input/output latch 1439 provides an inverting function to the data, relative to bus 122a; this inversion will be appropriately taken into account by CPU 200.

FIG. 21a goes on to show the operation of a "simple" write memory access, i.e., where masking is not desired. Accordingly, signal ME remains in its low state, and the state of bit 1459a of transparency bus 1459 is in its high state, as during the read memory access. Signal LD has returned to its low state, to disable driver 2028. At this time, the data to be written to memory from CPU 200 (shown as "DATA$_{OUT}$" in FIG. 21a) can appear at bus 205. Signal WL goes to its high state, allowing data DATA$_{OUT}$ to write the state of latch 2020 accordingly. Once latched, signal WL can return to its low logic level, and bit 205a of bus 205 can carry other unassociated information. The true side of latch 2020 (inverted from DATA$_{OUT}$ on data bus bit 205a), appears at the input of drive buffer 2022, multiplexer 1430 being controlled by sequencer 1400 to select bus 1436. Responsive to signal TRI going to its low state, drive buffer 2022 is enabled, and is operative to drive the data at the true side of latch 2020 to bit 122a of memory bus 122.

Figure 21B:
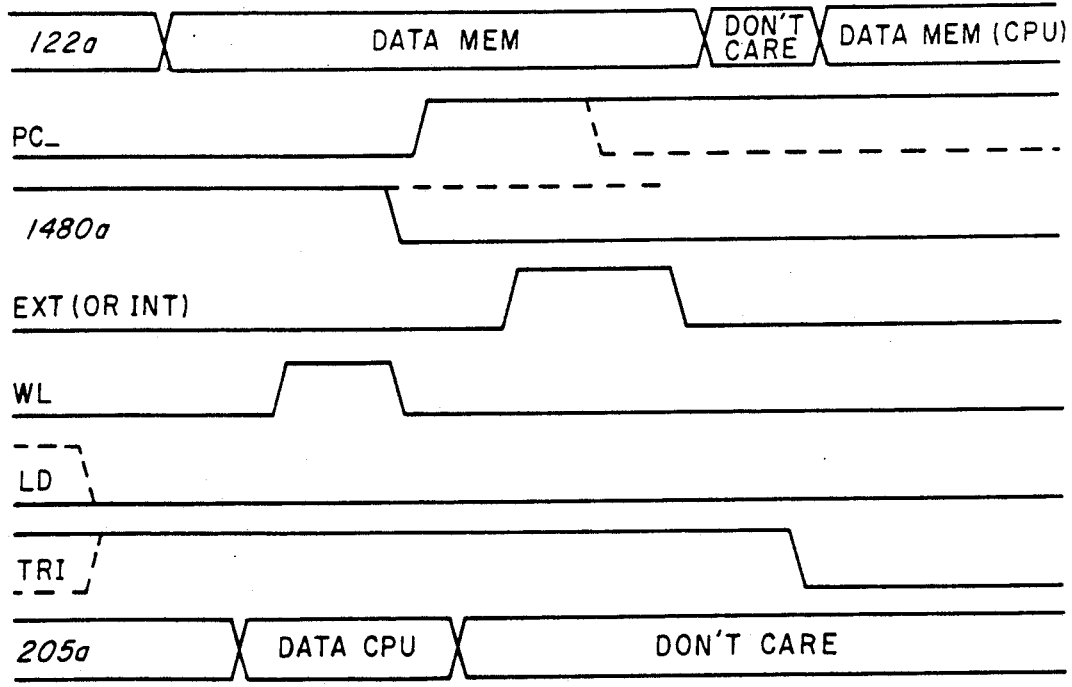

Referring now to FIG. 21b, the operation of input/output latch 1439 in carrying out the read-modify-write cycle described above in association with the masking feature will be described in detail. Initially, signal ME (not shown) is in its high logic state, so as to enable the mask bits 1437a, 1438a and 1457a to affect the masking operation. Signals EXT and INT are in their low logic state, as are signals LD and WL; signal TRI is in its high state after the addressing of memory 130 (again not shown), putting the output of drive buffer 2022 in its high-impedance state. Precharge signal PC— is in its low logic state at this time, so that mask data bus bit 1480a is precharged to a high level, awaiting the receipt of the masking data. During this time, memory 130 can be read by memory interface 250, with the results DATA$_{MEM}$ of the read operation appearing at bit 122a of memory bus 122; since transistors 2010 and 2016 are non-conductive, the data so appearing on bit 122a is isolated from the remainder of the circuit.

During this time, data from CPU 200 on bit 205a of bus 205 (DATA$_{CPU}$) can write the state of latch 2020; this occurs by signal WL going to its high logic state. After latch 2020 is set, signal WL can return to a low logic level, and bit 205a of bus 205 can then carry unassociated data. After latch 2020 is loaded, the mask data can be applied to bits 1437a, 1438a and 1457a. If any of the bits 1437a, 1438a and 1457a indicate a mask condition by being in their low state, mask data bus bit 1480a will be pulled low. After precharge signal PC— is taken high, the result will be a high output from NAND gate 2006, turning on transistor 2010 (and transistor 2012), and will cause NAND gate 2008 and inverter 2009 to latch this high level at the gate of transistor 2010, keeping transistor 2010 and 2012 on after precharge signal PC— returns low. It should be noted, of course, that a low level on bit 1459a of transparency mask 1459 will similarly cause a high logic level at the gates of transistors 2010 and 2012. The mask condition therefore defeats the isolation provided by transistor 2010 to bit 122a of memory bus 122. At such time as signal EXT goes to a high level, the data bit DATA$_{MEM}$ will rewrite the state of latch 2020, and the state of data bit DATA$_{CPU}$ previously written there will be lost, in accordance with the mask operation. After latch 2020 has been rewritten with the data bit DATA$_{MEM}$, signal TRI can go to its low level, and drive bit 122a of bus 122 to the level indicated by bit DATA$_{MEM}$. This occurs during the write portion of the read-modify-write memory access, and serves to rewrite the original contents of the memory location addressed regardless of the state of the data DATA$_{CPU}$, thus performing the mask function.

In the case where none of the mask bits 1437a, 1438a, 1457a or 1459a indicate a mask condition, mask data bus bit 1480a would remain in its high logic state, as indicated by the dashed lines of FIG. 21b. In that event, transistor 2010 would not be enabled, and data DATA$_{MEM}$ would not rewrite the contents of latch 2020. At such time as signal TRI went to its low state, during the write portion of the read-modify-write memory access, the value of DATA$_{CPU}$ (inverted, as in the simple write cycle) would be driven by drive buffer 2022 onto bit 122a of bus 122, regardless of the value of DATA$_{MEM}$, consistent with the writing of data to memory for those bits which are not desired to be masked.

The operation of transistors 2012 and 2018 serve to allow the masking operation to be used in the event that the results of internal memory are to be written. Rather than transistor 2016 being enabled by signal EXT, the signal INT can be used to rewrite the state of latch 2020, after being written by bit 205a of bus 205 (DATA$_{CPU}$). This would require a read from internal memory to occur after the latch 2020 has been written by DATA$_{CPU}$ during the high level of signal WL, accordingly placing the contents of DATA$_{MEM}$ on bit 205a of bus 205. The results of the mask bits 1459a, 1437a, 1438a and 1457a would likewise determine whether transistor 2012 were turned on, and thereby connect the value of DATA$_{MEM}$ to the true side of latch 2020. In so using input/output latch 1439 for internal memory operations including masking, signal LD would then go to its high state (rather than signal TRI going to its low state), and bit 205a of bus 205 would be driven with DATA$_{CPU}$ or DATA$_{MEM}$, depending upon whether or not the mask bits 1459a, 1437a, 1438a and 1457a, allowed DATA$_{MEM}$ to rewrite latch 2020.

It should thus be noted that the masking operation can take place by the connection of a "mask bus" (mask data bus bit 1480a) to the data bus (205a) at the point of the input/output latch 1439, thereby allowing the masking operation to occur without necessity of intervention by CPU 200. Accordingly, the operations of loading and retreiving destination data into and from a separate register, and the logical operations required to perform the masking function, are not required by a graphics controller according to the instant invention. As a result, bit-addressable operations may easily and quickly be performed by the controller according to the invention, with little impact on its overall performance.

Although the invention has been described in detail herein with reference to its preferred embodiment, it is to be understood that this description is by way of example only, and is not to be construed in a limiting sense. It is to be further understood that numerous changes in the details of the embodiments will be apparent to, and may be made by, persons of ordinary skill in the art having reference to this description. It is contemplated that such changes and additional embodiments are within the spirit and scope of the invention as claimed below.

We claim:

1. A memory controller, comprising: a data bus for communicating a plurality of data bits in parallel;

a mask bus for communicating a plurality of mask bits in parallel, each of said mask bits associated with a data bit of said data bus, each of said mask bits having a first logic state and having a second logic state;

data processing circuits for executing data processing instructions, said data processing circuits presenting data on said data bus and the mask information on said mask bus as a result of said instructions;

data terminals; and data control means, connected to said data bus, to said mask bus and to said data terminals, for presenting on said data terminals selected data communicated by said data bus from said data processing circuits, wherein said data control means is responsive to said mask bus so that responsive to a mask bit being in its first logic state, the data bit of said data bus associated with said mask bit is blocked from said data terminals, and so that responsive to a mask bit being in its second logic state, the data bit of said data bus associated with said mask bit is presented on said data terminals, said data control means including plural latches each connected to one of said associated data and mask bits and data terminal, said mask bit state controlling the latching of a data bit in said latch.

2. The memory controller of claim 1, wherein said data control means is also for receiving data on said data terminals and communicating said data to said data bus for receipt by said data processing circuits;

and wherein said data control means, responsive to a mask bit being in its first logic state, presents on said data terminals the data received on said data terminals corresponding to the data bit of said data bus associated with said mask bit, and responsive to a mask bit being in its second logic state, presents on said data terminals the data bit of said data bus associated with said mask bit.

3. The memory controller of claim 2, wherein said data control means includes, for each data terminal;

means, connected to said data bus, for loading said latch with a data bit of said data bus;

means, responsive to a mask bit of said mask bus being in its first logic state, for connecting said latch to said data terminal, so that said latch is loaded with data received by said data terminal; and drive means, connected to said latch and to said data terminal, for driving said data terminal with the data stored by said latch.

4. The memory controller of claim 1, further including:

a first mask register, connected to said mask bus, for storing a first mask, said first mask register having a mask bit associated with each mask bit of said mask bus; and a second mask register, connected to said mask bus, for storing a second mask, said second mask register having a mask bit associated with each mask bit of said mask bus.

5. The memory controller of claim 4, further including:

mask logic means, connected to said first mask register and to said second mask register and to said mask bus, for performing a predetermined logical operation on the contents of said first mask register and said second mask register and for placing the result of said predetermined logical operation on said mask bus.

6. The memory controller of claim 5, wherein said mask logic means includes a wired OR connection.

7. A graphics processing system, comprising:

a memory including a plurality of addressable locations;

an external bus for communicating address, control, and data signals to and from said memory;

data processing circuits for executing data processing instructions, said data processing circuits presenting data on said data bus and the mask information on said mask bus as a result of said instructions; and a memory controller, including:

a data bus for communicating a plurality of data bits in parallel;

a mask bus for communicating a plurality of mask bits in parallel, each of said mask bits associated with a data bit of said data bus, each of said mask bits having a first logic state and having a second logic state;

memory interface circuits, connected to said data processing circuits and to said external bus, for communicating address and control signals to said external bus responsive to said data processing circuits; and data control circuits, connected to said data bus, to said mask bus and to said external bus, for presenting on said external bus selected data communicated by said data bus from said data processing circuits, wherein said data control circuits are responsive to said mask bus so that responsive to a mask bit being in its first logic state, the data bit of said data bus associated with said mask bit is blocked from said external bus, and so that responsive to a mask bit being in its second logic state, the data bit of said data bus associated with said mask bit is presented on said data terminals, said data control circuits including plural latches each connected to one of said associated data and mask bits and data terminal, said mask bit state controlling the latching of a data bit in said latch.

8. The system of claim 7, wherein said memory presents on said external bus the contents of the memory location corresponding to an address signal from said memory interface circuits, responsive to said memory interface circuits presenting a read control signal on said external bus;

and wherein said data control circuits, responsive to a mask bit being in its first logic state, present on said external bus the bit of the contents of the memory location corresponding to said address signal and corresponding to the data bit of said data bus associated with said mask bit and said data control circuits, responsive to a mask bit being in its second logic state, present on said external bus the data bit of said data bus associated with said mask bit so that, responsive to a write control signal presented on said external bus by said memory interface means, said memory location is loaded with data bits from said data bus corresponding to mask bits in the second logic state, and is loaded with its presented contents for those data bits of said data bus corresponding to said mask bits in the first logic state.

9. A system of claim 8, wherein said external bus includes a plurality of data lines, each data line corresponding to a data bit of said data bus;

wherein said data control circuits include, for each of said data lines:

means, connected to said data bus, for loading said latch with a data bit of said data bus;

means, responsive to a mask bit of said mask bus being in its first logic state, for connecting said latch to said data line, so that said latch is loaded with data presented on said data line by said memory; and drive means, connected to said latch and to said data terminal, for driving said data terminal with the data stored by said latch.

10. The system of claim 9, wherein said data processing circuits further include an internal memory, responsive to internal address and internal control signals presented by said data processing circuits, and responsive to data on said data bus;

and wherein said data control circuits further include means, responsive to a control signal from said data processing circuit, and responsive to a mask bit of said mask bus being in its first logic state, for connecting said latch to said data line, so that said latch is loaded with data presented on said data line by said memory.

11. The system of claim 7, wherein said memory interface circuits further include a multiplexer, connected to said data control circuits, and said external bus, so that said address signals and said data signals are multiplexed on said external bus.

12. The system of claim 7, wherein said memory interface circuits further include:

a first mask register, connected to said mask bus, for storing a first mask, said first mask register having a mask bit associated with each mask bit of said mask bus; and a second mask register, connected to said mask bus, for storing a second mask, said second mask register having a mask bit associated with each mask bit of said mask bus.

13. The device of claim 12, wherein said memory interface circuits further include:

mask logic means, connected to said first mask register and to said second mask register and to said mask bus, for performing a predetermined logical operation on the contents of said first mask register and said second mask register and for placing the result of said predetermined logical operation on said mask bus.

14. The device of claim 13, wherein said mask logic means include a wired, OR connection.

15. A memory controller for a graphics processing system comprising:

a. a sequencer having plural inputs adapted to receive plural request signals for access to associated memory circuits and adapted to receive plural signals indicating the reading and writing of data and instructions to and from said memory circuits, said sequencer having plural outputs and producing output signals on said outputs in response to receipt of said signals on said inputs;

b. a multiplexer having address outputs and first bidirectional data leads adapted to be connected to said associated memory circuits, said first bidirectional data leads being adapted to carry an accessed set of data bits in parallel between said memory circuits and said multiplexer, said multiplexer also having plural sets of address inputs adapted to receive plural sets of memory addresses and also having plural sets of second bidirectional data leads for carrying plural sets of data bits in parallel to and from said multiplexer, said multiplexer carrying one selected set of addresses from said inputs to said outputs in response to said sequencer output signals and conveying one set of data bits between said first and second bidirectional data leads in response to said sequencer outputs; and c. masking circuits connected to at least one of said second bidirectional sets of data leads and having mask inputs adapted to receive mask data in the form of mask data bits in parallel, said masking circuits masking in parallel individual bits of said one set of data bits in response to at least said mask data bits.

16. The controller of claim 15 in which said masking circuits are connected in series with said at least one of said second bidirectional sets of data leads.

17. The controller of claim 15 in which said masking circuits mask in parallel individual bits of said one set of data bits also in response to said sequencer outputs.

18. The controller of claim 15 in which said sequencer includes a programmable controller producing said sequencer outputs.

19. The controller of claim 15 in which said masking circuits include an I/O latch having controller data bus leads connected in series with said at least one of said second bidiractional sets of data leads, having said mask inputs and having general bus leads connected in series with said at least one of said second bidirectional sets of data leads, said I/O latch also having control inputs connected to said sequencer outputs.

20. The controller of claim 19 in which said I/O latch includes plural bit latches arranged in parallel, there being one bit latch for each lead of said at least one of said second bidirectional sets of data leads, with each lead carrying one bit of said parallel data bits.

21. The controller of claim 19 in which said I/O latch operates to mask data received from said general bus leads and operates to mask data received on said controller bus leads in response to said mask data received on said mask leads and in response to said output signals from said sequencer.

22. The controller of claim 15 in which said masking circuits include mask data bus leads capable of carrying one set at a time of plural sets of mask data, each said set of mask data being parallel bits of binary sense.

23. The controller of claim 22 in which said masking circuits include latch circuits connected to each lead of said at least one set of said second bidirectional sets of data leads, said latches operate to block said data bits in response to said mask data bits of one sense and latching said data bits in response to said mask data bits of the other sense.

24. The controller of claim 22 in which said plural sets of mask data include plane mask data, left mask data, and right mask data.

25. The controller of claim 24 in which said masking circuits include right mask circuits connected to said mask data bus leads and left mask circuits connected to said mask data bus leads, said right mask circuits being connected to said sequencer outputs and serving to produce mask data to mask the least significant bit portions of said data carried on said bidirectional data leads, and said left mask circuits being connected to said sequencer outputs and serving to produce mask data to mask the most significant bit portions of said data carried on said bidirectional data leads.

26. The controller of claim 25 in which said plane mask data originates outside of said controller.

27. The controller of claim 22 in which said mask inputs of said masking circuits also receive transparency mask data for masking said one set of data bits.

* * * * *